United States Patent
Fthenakis et al.

(10) Patent No.: US 7,731,920 B2
(45) Date of Patent: Jun. 8, 2010

(54) SYSTEM AND METHOD FOR SEPARATING TELLURIUM FROM CADMIUM WASTE

(75) Inventors: Vasilis Fthenakis, Dix Hills, NY (US); Wenming Wang, Ridge, NY (US)

(73) Assignee: Brookhaven Science Associates, Upton, NY (US)

(*) Notice: Subject to any disclaimer, the term of this patent is extended or adjusted under 35 U.S.C. 154(b) by 687 days.

(21) Appl. No.: 11/421,343

(22) Filed: May 31, 2006

(65) Prior Publication Data

US 2006/0275191 A1 Dec. 7, 2006

Related U.S. Application Data

(60) Provisional application No. 60/686,911, filed on Jun. 3, 2005.

(51) Int. Cl.
| | |
|---|---|
| B01D 15/04 | (2006.01) |
| B01J 39/00 | (2006.01) |
| C01B 19/00 | (2006.01) |
| C22B 3/24 | (2006.01) |
| C22B 3/42 | (2006.01) |
| C22B 15/00 | (2006.01) |
| C22B 17/00 | (2006.01) |

(52) U.S. Cl. ............... 423/100; 423/109; 423/508; 75/743; 210/660

(58) Field of Classification Search ............ 210/660, 210/661, 663; 423/100

See application file for complete search history.

(56) References Cited

U.S. PATENT DOCUMENTS

| | | | |
|---|---|---|---|
| 3,699,207 | A | 10/1972 | Roever et al. |
| 3,997,644 | A | 12/1976 | Sano et al. |
| 4,053,553 | A | 10/1977 | Reinhardt et al. |
| 4,089,816 | A | 5/1978 | Sano et al. |
| 4,167,481 | A | 9/1979 | Cremers et al. |
| 4,244,936 | A | 1/1981 | Victor et al. |
| 4,256,912 | A | 3/1981 | Wolsky et al. |
| 4,341,636 | A | 7/1982 | Harder et al. |
| 4,425,236 | A | 1/1984 | Neunhoeffer et al. |
| 4,469,628 | A | 9/1984 | Simmons et al. |
| 4,500,497 | A | 2/1985 | Rowley et al. |
| 4,565,673 | A | 1/1986 | Kataoka et al. |
| 4,797,366 | A | 1/1989 | Van Lookeren-Campagne |
| 4,883,599 | A | 11/1989 | Lindahl et al. |

(Continued)

FOREIGN PATENT DOCUMENTS

EP 0244021 A1 4/1987

(Continued)

OTHER PUBLICATIONS

Sasala et al., Physical and Chemical Pathways for Economic Recycling of Cadmium Telluride Thin-Film Photovoltaic Modules, May 13-17, 1996 (25th PVSC), IEEE, p. 865-868.*

(Continued)

Primary Examiner—Roy King
Assistant Examiner—Jared Wood
(74) Attorney, Agent, or Firm—Steptoe & Johnson LLP

(57) ABSTRACT

The present invention relates to a method and system for recovery of waste.

23 Claims, 25 Drawing Sheets

U.S. PATENT DOCUMENTS

| | | | |
|---|---|---|---|
| 4,902,665 | A | 2/1990 | Elfine et al. |
| 4,917,781 | A | 4/1990 | Sharifian et al. |
| 5,066,371 | A | 11/1991 | DeVoe et al. |
| 5,286,464 | A | 2/1994 | Dragisich |
| 5,575,907 | A | 11/1996 | Lindermann |
| H1661 | H * | 7/1997 | Koff et al. .................. 210/670 |
| 5,779,877 | A | 7/1998 | Drinkard, Jr. et al. |
| 5,897,685 | A | 4/1999 | Goozner et al. |
| 5,997,718 | A | 12/1999 | Goozner et al. |
| 6,049,021 | A | 4/2000 | Getman et al. |
| 6,063,995 | A | 5/2000 | Bohland et al. |
| 6,086,769 | A | 7/2000 | Kilambi et al. |
| 6,096,217 | A | 8/2000 | Kilambi et al. |
| 6,129,779 | A | 10/2000 | Bohland et al. |
| 6,162,648 | A | 12/2000 | Maloney et al. |
| 6,391,165 | B1 | 5/2002 | Bohland et al. |
| 6,572,782 | B2 | 6/2003 | Campo et al. |
| 6,838,004 | B1 | 1/2005 | Yang et al. |
| 2002/0030035 | A1 | 3/2002 | Dieguez et al. |

FOREIGN PATENT DOCUMENTS

| | | |
|---|---|---|
| EP | 0463674 A2 | 2/1992 |
| EP | 0 536 466 | 4/1993 |
| EP | 0536466 A1 | 4/1993 |
| GB | 1028469 | 5/1996 |
| WO | WO 90/01076 | 2/1990 |
| WO | WO 0050343 | 8/2000 |
| WO | WO 2004/101435 | 11/2004 |

OTHER PUBLICATIONS

Bohland et al., Economic Recycling of CdTe Photovoltaic Modules, Sep. 30-Oct. 3, 1997 (26$^{th}$ PVSC), IEEE, p. 355-358.*

Rohm and Haas, Amberlite IRC748 Industrial Grade Chelating Resin for Metals Removal, http://www.rohmhaas.com/assets/attachments/business/process_chemicals/amberlite_irc/amberlite_irc748/tds/amberlite_irc748.pdf.*

W. Wang and V.M. Fthenakis, Leaching of Cadmium, Tellurium and Copper from Cadmium Telluride Photovoltaic Modules (progress report), Feb. 3, 2004, National Photovoltaic EHS Assistance Center Environmental Sciences Department Brookhaven National Laboratory.*

Li-Chun Lin, Ruey-Shin Juang, Ion-Exchange Equilibria of Cu(II) and Zn(II) from Aqueous Solutions with CHELEX 100 and Amberlite IRC 748 Resins, 2005, Chemical Engineering Journal, 112, pp. 211-218.*

Ahmed et al., The Removal of Cadmium and Lead from Aqueous Solution by Ion Exchange with Na-Y Zeolite, *Separation and Purification Technology*, 13: 57-64 (1998).

Bohland, et al., Photovoltaics as Hazardous Materials; The Recycling Solution, World Conference and Exhibition on Photovoltaic Energy Conversion, Vienna, Austria (1998).

Bratek, et al., The Utilization of Waste Ion Exchange Resin in Environmental Protection, *Fuel Processing Technology*, 77-78:431-436 (2002).

Dabrowski, et al., Selective Removal of the Heavy Metal Ions from Waters and Industrial Wastewaters by Ion-Exchange Method, *Chemosphere*, 56:91-106 (2004).

Gasser, et al., Separation of Strontium and Cadmium Ions from Nitrate Medium by Ion-Exchange Membrane in An Electrodialysis System, *Journal of Chemical Technology and Biotechnology*, 79:97-102 (1994).

Fthenakis, et al., *NCPV Photovoltaics Program Review*, The American Institute of Physics, 332-337 (1999).

Fthenakis, End-of-Life Management and Recycling of PV Modules, *Energy Policy*, 28:1051-1058(2001).

Mathialagan, et al., Adsorption of Cadmium from Aqueous Solutions by Vermiculite, *Journal of Hazardous Materials*, B94:291-303 (2002).

Lacour, et al., Removal of Heavy Metals in Industrial Wastewaters by Ion-Exchanger Grafted Textiles, *Analytica Chimica Acta* 428:121-132 (2001).

Sharma, Economic Treatment of Cadmium(II)-Rich Hazardous Waste by Indigenous Material, *Journal of Colloid and Interface Science*, 173:66-70 (1995).

Singh, et al., Studies on Cd(II) Removal from Water by Adsorption, *Journal of Hazardous Materials*, 60:29-40(1998).

Tolley, et al., Recovering Cadmium and Tellurium from Thin-Film Photovoltaic Device Scrap, *Pollution Prevention for Process Engineering*, 321-327, U.S. Bureau of Mines, Salt Lake City, UT (1995).

Database Compendex Proceedings of the 25$^{th}$ IEEE Conference/EIX970434300 (May 17, 1996), Sasala, R.A., et al., 73: "Physical and chemical pathways for economic recycling of cadmium telluride thin-film photovoltaic modules".

Wenming Wang and Vasilis Fthenakis, "Kinetics study on separation of cadmium from telluride in acidic solution media using ion-exchange resins," Journal of Hazardous Materials, No. 8125, 2005, pp. 80-88, XP002535850.

* cited by examiner

Cd Leaching Experiments #17-#20. (RO: ratio of H₂O₂ to glass in mL/kg; R: ratio of leaching solution to glass in mL/kg)

Te Leaching Experiments #17-#20. (RO: ratio of H₂O₂ to glass in mL/kg; R: ratio of leaching solution to glass in mL/kg)

Cd Leaching Experiments #14-#16. (RO: ratio of $H_2O_2$ to glass in mL/kg; R: ratio of leaching solution to glass in mL/kg)

Te Leaching Experiments #14-#16. (RO: ratio of $H_2O_2$ to glass in mL/kg; R: ratio of leaching solution to glass in mL/kg)

Cd Leaching Experiments #16, 19, 20. (RO: ratio of $H_2O_2$ to glass in mL/kg; R: ratio of leaching solution to glass in mL/kg)

Te Leaching Experiments #16, 19, 20. (RO: ratio of $H_2O_2$ to glass in mL/kg; R: ratio of leaching solution to glass in mL/kg)

SYSTEM AND METHOD FOR SEPARATING TELLURIUM FROM CADMIUM WASTE

CLAIM OF PRIORITY

This application claims priority under 35 USC §119(e) to U.S. Patent Application Ser. No. 60/686,911, filed on Jun. 3, 2005.

STATEMENT OF GOVERNMENT RIGHTS

This invention was made under a CRADA BNL-C-04-10 between FIRST SOLAR, LLC and BROOKHAVEN SCIENCE ASSOCIATES, LLC operator of Brookhaven National Lab under contract number DE-AC02-98CH10886 for the United States Department of Energy. The Government has certain rights in this invention.

TECHNICAL FIELD

The invention relates to a tellurium waste recovery system and method.

BACKGROUND

Cadmium telluride (CdTe) photovoltaics (PV) is a new and promising energy generation technology. However, such cadmium telluride photovoltaic modules may be characterized as hazardous waste because they contain a cadmium compound. Cadmium is a toxic element and tellurium is a rare one. Separating the two elements enables cleaning of hazardous waste streams and recovery of the valuable tellurium.

Photovoltaic modules at the end of their useful life have to be decommissioned and disposed of, or re-used in some way. Environmental regulations can impact the complexity and the cost of dealing with end-of-life photovoltaic modules. For example, the inclusion of spent photovoltaic modules with waste electric- and electronic-equipment under some European directives (e.g., Waste from Electric & Electronics Equipment (WEEE) and Restrictions on the use of certain Hazardous Substances (RoHS)) will impact cadmium telluride photovoltaic modules that contain lead and cadmium compounds, respectively.

Handling and disposing of spent modules and manufacturing scrap characterized as hazardous costs about twenty times more than dealing with non-hazardous waste. Recycling the semimetals such as tellurium from spent photovoltaic modules addresses this issue because the hazardous elements in a photovoltaic module typically are less than 0.1% of its mass.

SUMMARY

In one aspect, a method for recycling a photovoltaic device includes fragmenting a photovoltaic device, exposing at least a portion of a photovoltaic device with a leaching agent to form a liquid phase and a solid phase, separating the liquid phase from the solid phase, contacting the liquid phase with a cation exchange resin, collecting a tellurium-containing solution from the resin, and removing cadmium from resin. The fragments can include cadmium, tellurium and glass. The cadmium and the tellurium can be extracted from the fragments at ambient temperature. The leaching agent can have a pH of less than 6 and can include a sulfuric acid. The concentration of the sulfuric acid can be at least 0.5 M. The leaching agent can include hydrogen peroxide. The ratio of hydrogen peroxide to glass can be less than 5.0. The leaching agent can have a liquid to solid ratio that is less than 480 mL/kg. The liquid phase can have a pH range of 0.0 to 1.0. The cadmium can be removed from the resin at room temperature. The cadmium can be removed from the resin with an acid that has a pH of less than 6, or 4 or 2. The cadmium can be removed from the resin with sulfuric acid. The cation exchange resin can include an iminodiacetic acid chelating resin or an acid cation resin containing at least 8% divinylbenzene. The cation exchange resin can be first swelled with water.

In another aspect, a method for separating cadmium and tellurium can include contacting a tellurium-containing solution with a cation exchange resin, collecting a tellurium-containing solution from the resin and removing cadmium from the cation exchange resin. In a further aspect, a method for recovering tellurium waste can include contacting a waste solution with a cation exchange resin, and collecting a tellurium-containing solution from the resin. In one aspect, a system for recycling a photovoltaic device can include fragmenting a photovoltaic device, exposing at least a portion of a photovoltaic device with a leaching agent to form a liquid phase and a solid phase, separating the liquid phase from the solid phase, contacting the liquid phase with a cation exchange resin column, collecting a tellurium-containing solution from the resin, and removing cadmium from resin.

In another aspect, a method for separating cadmium and tellurium can include removing other metals, such as copper, from a leaching solution.

The details of one or more embodiments are set forth in the accompanying drawings and the description below. Other features, objects, and advantages will be apparent from the description and drawings, and from the claims.

BRIEF DESCRIPTION OF THE DRAWING

FIG. 6 are graphs depicting the separation of cadmium and copper from tellurium by adsorption on Resin B.

FIG. 7 are graphs depicting the removal of cadmium from cadmium and tellurium-containing solution using Resin A.

DETAILED DESCRIPTION

Figure 1A:
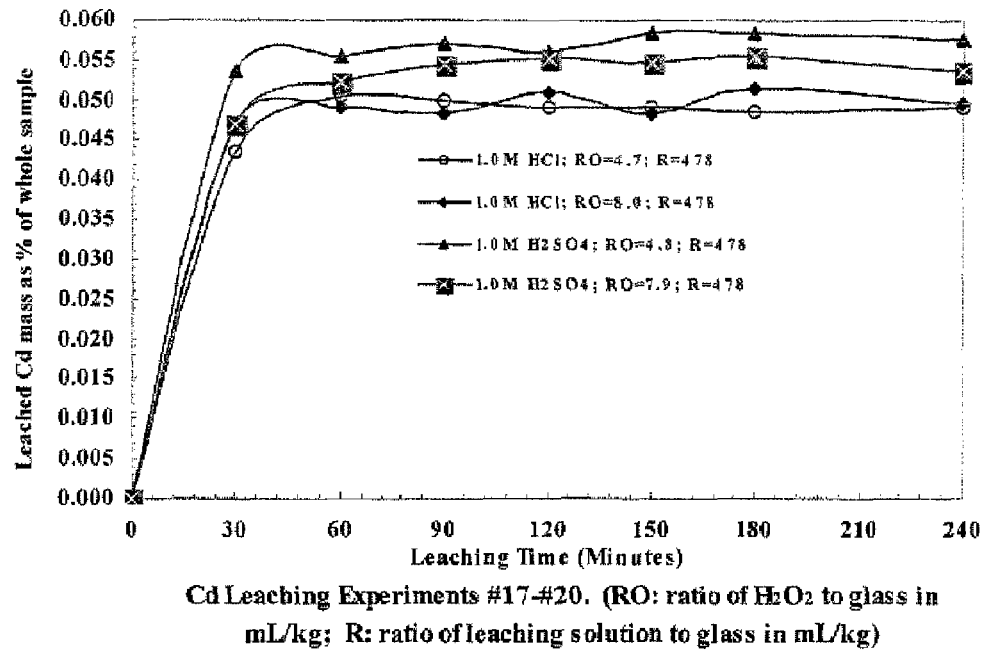
FIG. 1A is a graph depicting the comparison of the efficiency of leaching cadmium with $H_2SO_4/H_2O_2$ and $HCl/H_2O_2$ solutions.

A method was developed to completely separate and recover cadmium from spent modules. This method also focuses on the cost-effective recovery of tellurium so that it can be reused in photovoltaic manufacture. As an example, this invention can be used for, separating cadmium from tellurium in binary or tertiary systems, particularly, but not exclusively, photovoltaic module processing waste streams which contain tellurium, cadmium, and copper in water-soluble forms. The present invention provides a complete separation of tellurium from cadmium from aqueous solution. Cadmium can include elemental cadmium, cadmium ions, cadmium salts and cadmium compounds. Tellurium can include elemental tellurium, tellurium ions, tellurium salts and tellurium compounds. The separation, and consequently recovery, of tellurium from cadmium by the existing methods is not satisfactory. Other approaches of recycling CdTe photovoltaic modules are inefficient or impractical.

Previous attempts in separating cadmium from tellurium have included leaching with solutions of ferric chloride/hydrochloric acid (Tolley et al., *U.S. Department of the Interior, U.S. Bureau of Mines, Government Report*, I 28.23:9588 (RI 9588), 1995); oxygen-pressure leaching using sulfuric acid (Tolley et al., *U.S. Department of the Interior, U.S. Bureau of Mines, Government Report*, I 28.23:9588 (RI 9588), 1995); nitric-acid leaching (U.S. Pat. Nos. 5,779,877, 5,897,685, 5,997,718) and leaching with sulfuric acid/hydrogen peroxide (Bohland et al., In: Fthenakis et al. (Eds), *BNL/NREL Workshop "PV and the Environment"*, Keystone, Colo., Jul. 23-24, 1998, BNL-52557; U.S. Pat. Nos. 6,129,779, 6,391, 165).

The method of leaching with solutions of ferric chloride/hydrochloric acid failed to separate cadmium from Fe as tellurium was not leached into solution. Oxygen-pressure leaching separated cadmium from tellurium to a significant degree, but the residues contained 4% to 7% of cadmium mixed with tellurium and sulfur. Further, due to the high pressure and temperature needed, this process was capital intensive, and thus, unattractive for low-cost recycling. Nitric-acid leaching recovered 96% of the tellurium, leaving cadmium in solution. This method was first proposed and patented by Drinkard et al. (U.S. Pat. Nos. 5,779,877, 5,897, 685, 5,997,718). PV module glass is first crushed into fragments, and then subjected to highly concentrated nitric acid (50~60%) leaching at the temperature of 60° C.-80° C., which inevitably creates nitric acid fumes and possible nitric-acid emissions. After leaching, the sludge is subjected to solid-liquid separation by filtration. Drinkard et al. proposed subjecting the filtrate to electrolysis to recover tellurium as metal from the cathode while leaving cadmium in the electrolyte. However, the investigators tested this hypothesis on artificially high cadmium concentration solutions (9648-10763 ppm). In actual leaching solutions, the cadmium concentration does not exceed 1000 ppm, and electrolytic separation of cadmium from tellurium in such low concentration is inefficient (e.g., not greater than 30%). Furthermore, even when using a surrogate solution with 1.0% (10000 ppm) of tellurium and cadmium in 2.0 M nitric acid media, these investigators ended with 226-499 ppm of tellurium. Clearly, the separation of tellurium from cadmium is far from being complete in this method.

Bohland and co-workers (In: Fthenakis et al. (Eds), *BNL/NREL Workshop "PV and the Environment"*, Keystone, Colo., Jul. 23-24, 1998, BNL-52557; U.S. Pat. Nos. 6,129, 779, 6,391,165, 6,063,995) investigated leaching using a solution of 3.6 N $H_2SO_4$ acid and 1% to 2% wt $H_2O_2$. Cadmium telluride dissociated, and both metals were transported into the aqueous phase. The spent etchant was neutralized and the elements were precipitated into a sludge phase that was conditioned and then leached with concentrated potassium hydroxide. The filtrate was subjected to electrowinning to recover metallic tellurium from the cathode. The reported tellurium recovery percentage is 67%~80%. The cadmium remaining in the sludge is currently not recovered by this method. Instead, the sludge is sent to a smelter for the treatment of cadmium. The drawback of this process is that sulfuric acid is neutralized with large amount of carbonate salts and lime to precipitate tellurium and cadmium. In addition, sulfuric acid cannot be recycled and reused and cadmium cannot be recovered by this method. Further, the recovery percentage of tellurium is extremely poor due to the following reasons: After the first leaching step, tellurium is in both the tetravalent (IV) and the hexavalent (VI) states. Tellurium (IV) is sparingly soluble in acid media, insoluble in neutral media, and soluble in alkaline media; whereas tellurium (VI) is soluble in acid media, and insoluble in alkaline media. Accordingly, when leached with potassium hydroxide for the tellurium recovery in the second step, the tellurium (VI) cannot be extracted into aqueous phase, thus, yielding a poor recovery percentage of tellurium. In other words, tellurium (VI) cannot be recovered by this procedure and multiple leaching-separation steps are involved. Cadmium is not recovered by this method and remains in the sludge with other metals, polymeric materials, and glass fines. Hence, none of the above-mentioned methods were very effective in recovering the metals from low-concentration leachate solutions.

Several researchers have studied adsorption as a means to remove cadmium from aqueous solutions while meeting stringent environmental regulations (Dabrowski et al., Chemosphere, 56:91-106 (2004); Barbier et al., Colloids and Surfaces: A: Physicochemical and Engineering Aspects, 166: 153-159 (2000); Singh et al., Journal of Hazardous Materials, 60:29-40 (1998); Cheung et al., Journal of Colloid and Interface Science 234, 328-336 (2001); Ahmed et al., Separation and Purification Technology, 13: 57-64 (1998); Rangel Mendez et al., Water Research 36:1244-1252 (2002); Benguella et al., Water Research 36:2463-2474 (2002); Mathialagan et al., Journal of Hazardous Materials B94:291-303 (2002); Bratek et al., Fuel Processing Technology 77-78:431-436 (2002)). The adsorbents tested included activated carbon, bone char, peat, lignite, vermiculite, chitin, zeolite, and the treated bark of Pinus Pinaster (the Maritime Pine). Those studies focused on the adsorption of cadmium from low-concentration, neutral aqueous solutions and do not describe the potential for separating cadmium from tellurium in acidic solutions.

Other methods for the removal of cadmium from solutions are disclosed in EP 0536466A1, U.S. Pat. No. 4,883,599, EP 0244021A1, EP 0463674A2, U.S. Pat. No. 6,162,648, U.S. Pat. No. 4,053,553, UK 1028469, U.S. Pat. No. 5,286,464. Methods that are relative to the removal and subsequently, recovery of soluble tellurium from vicinal glycol esters using ion exchange approaches are disclosed in U.S. Pat. Nos. 4,256,912 and 4,244,936. However, none of these methods and patents are pertinent to the system of cadmium and tellurium which is the subject of our invention.

In an embodiment, spent photovoltaic devices are fragmented prior to exposing the photovoltaic devices to leaching agents. One suitable non-limiting manner of performing the fragmenting step is to load the device into a fragmenting device, such as a hammer mill having a rotating arm which is capable of repeated forcible impact upon the device. The photovoltaic devices could be manually loaded into the fragmenting device or loaded into an automated device which could provide a means for elevating and dropping the photovoltaic devices into the fragmenting device.

After the photovoltaic devices are crushed, the fragmented photovoltaic devices are then transferred to a vessel containing a leaching agent. The cadmium and tellurium is removed from the fragments by leaching with a leaching agent which includes an acid. The broken PV module glass fragments are then subjected to acid leaching using a tumbling machine at ambient temperature. The leaching solution, which is also referred to as lixiviating agent (or etchant) comprises an aqueous solution of acid at concentrations in the range of 1.0 M to 4.0 M, and preferably 1.0 M to 2.0 M. The acid may include a sulfuric acid. The leaching agent may include a hydrogen peroxide solution. The hydrogen peroxide concentration may be about 2.0 mL/kg-solution to 6.0 mL/kg-solution. Here, hydrogen peroxide is used as oxidizer to convert tellurium from the valance state of −2 to +4 or +6.

During the leaching procedure, the metals e.g. cadmium and tellurium are extracted and solubilized into the liquid phase based on the following reactions:

$$CdTe + H_2O_2 + H_2SO_4 = CdSO_4 + 2H_2O + Te \quad (1)$$

$$Te + 2H_2O_2 + 2H_2SO_4 = 4H_2O + Te^{+4} + 2SO_4^{-2} \quad (2)$$

$$CdS + H_2O_2 + H_2SO_4 = CdSO_4 + 2H_2O + S \quad (3)$$

$$Te^{+4} + H_2O_2 + H_2SO_4 = Te^{+6} + SO_4^{-2} + 2H_2O \quad (4)$$

The leaching sludge including photovoltaic device fragments and leaching agent may be mixed and loaded into a plastic bottle with screw-threaded, sealed cap. The plastic bottle may then be placed into a tumbling machine. The leaching process may last for about 0.5 hour, 1 hour, 2 hours or any length of time that is sufficient for the transfer of cadmium and tellurium into liquid phase.

After the leaching step, the liquid phase may be separated from the solid phase in any suitable manner. One suitable non-limiting manner of separating the solid phase from the liquid phase is to transfer, or pour, the leaching sludge into a separating device having a screen which has a mesh size small enough to catch the solid phase while allowing the liquid phase to pass through into a container. The liquid phase may also be separated from the solid phase with for example, a pressurized filtration device, with filter paper of about 0.7 μm porous size. The solid phase may then be rinsed with dilute sulfuric acid solution several times. After such treatment, the glass will be free of environmentally hazardous metals and can be recycled.

After solid-liquid separation, the liquid phase containing tellurium and cadmium is subjected to cation exchange resin adsorption procedure. The process is basically carried out by passing the solution through a column of a cation exchange resin under conditions (described below) that retain the undesirable metal (e.g. cadmium) on the bed whereas tellurium remains in the solution. The cation exchange resin is a polymeric material that selectively binds the undesirable metal. The cation exchange resin may include an acidic cation exchange resin such as an iminodiacetic acid chelating resin or an acid cation resin containing at least 8% divinylbenzene. Such resins may be obtained commercially and may be strong cation exchange resins such as Dow 50 (Dry) H+ produced by the Dow Chemical Company or AMBERLYST® 15WET resin, AMBERLITE® IRC748 resin produced by Rohm and Haas, or DOWEX M4195 resin by Dow Chemical Company.

The system and method can successfully separate cadmium, tellurium and other metals, such as copper, present in the leaching solution. By using a chelating resin, such as DOWEX M4195, in addition to a cation exchange resin, other metals, such as copper, for example, can be successfully separated from a leached film. DOWEX M4195 is a chelating resin with a Bis-Picolylamine functional group. The chelating resin can be loaded in a first column, and the cation exchange resin can be loaded in a second column, or vice versa. An influent solution can be first fed into the first column, downwards, then passed through the second column. The types of columns and sequence of arrangement can be designed to suit an intended separation objective. For example, the chelating resin can remove other metals, such as copper, while the cation exchange resin can remove cadmium and iron.

The resin is preferably in a beaded form, which generally comprises particles with a particle size in the range of 0.600 to 0.850 mm. The resin may first be swelled with water.

In the ion exchange process, cadmium is retained in the resin, while tellurium remains in the solution. The cation exchange resin will adsorb different metals at different pH values. To ensure the adsorption of cadmium, the liquid phase is brought to a pH higher than about 0.0, preferably in the range of 0.0 to 1.0. Metals such as tellurium, sodium, and potassium are not adsorbed to any appreciable extent at this pH. The solution may be subjected to further treatment to recover tellurium. Also, after first four or five bed volumes of liquid phase has passed through the column, the effluent tellurium concentration was equal to or even bigger than influent tellurium concentration. This showed that tellurium cannot be adsorbed by the resin. Limited tests with another cation exchange resin (Dow 50 (Dry) H$^+$ produced by the Dow Chemical Company) showed similar results.

With large amount of spent leaching solution passing through, the cation exchange resin will eventually become fully loaded with cadmium. The process is extremely effective to remove cadmium from the tellurium solution, as well as certain other metal contaminants such as copper. The tested solutions are dilute solutions of sulfuric acid with tellurium, cadmium, and trace amounts of other metals obtained from PV module glass leaching.

Once the resin reaches its maximum capacity, the resin is then subjected to elution with either an acid such as sulfuric acid or hydrochloric acid to recover cadmium as either cadmium sulfate ($CdSO_4$) or cadmium chloride ($CdCl_2$). Before recovering cadmium from the resin, very dilute acid (or $Na_2SO_4$ in water) is used to rinse away tellurium remaining in the resin. After a preliminary rinse, the cation exchange resin free of tellurium is then eluted with a high concentration of acid to ensure that all cadmium adsorbed on the resin be stripped into the eluate.

The cation exchange resin may be regenerated by rinsing with an aqueous solution that contains either sulfuric acid or hydrochloric acid at a concentration of 5.0 M. The amount of regenerating solution required is about 1-5 bed volumes. The flow rate of elution was kept at the level of 1.5 to 2.0 bed volume per hour.

After elution, the cation exchange resin may be regenerated with sulfuric acid or hydrochloric acid, and reused for the next cycle. The eluting solution, which is concentrated and loaded with cadmium free of tellurium, may be subjected to electroplating to recover cadmium as metal from the cathode, or subjected to evaporation to recover cadmium as cadmium sulfate ($CdSO_4$) or cadmium chloride ($CdCl_2$) depending on the type of the acid used in elution.

Figure 14:
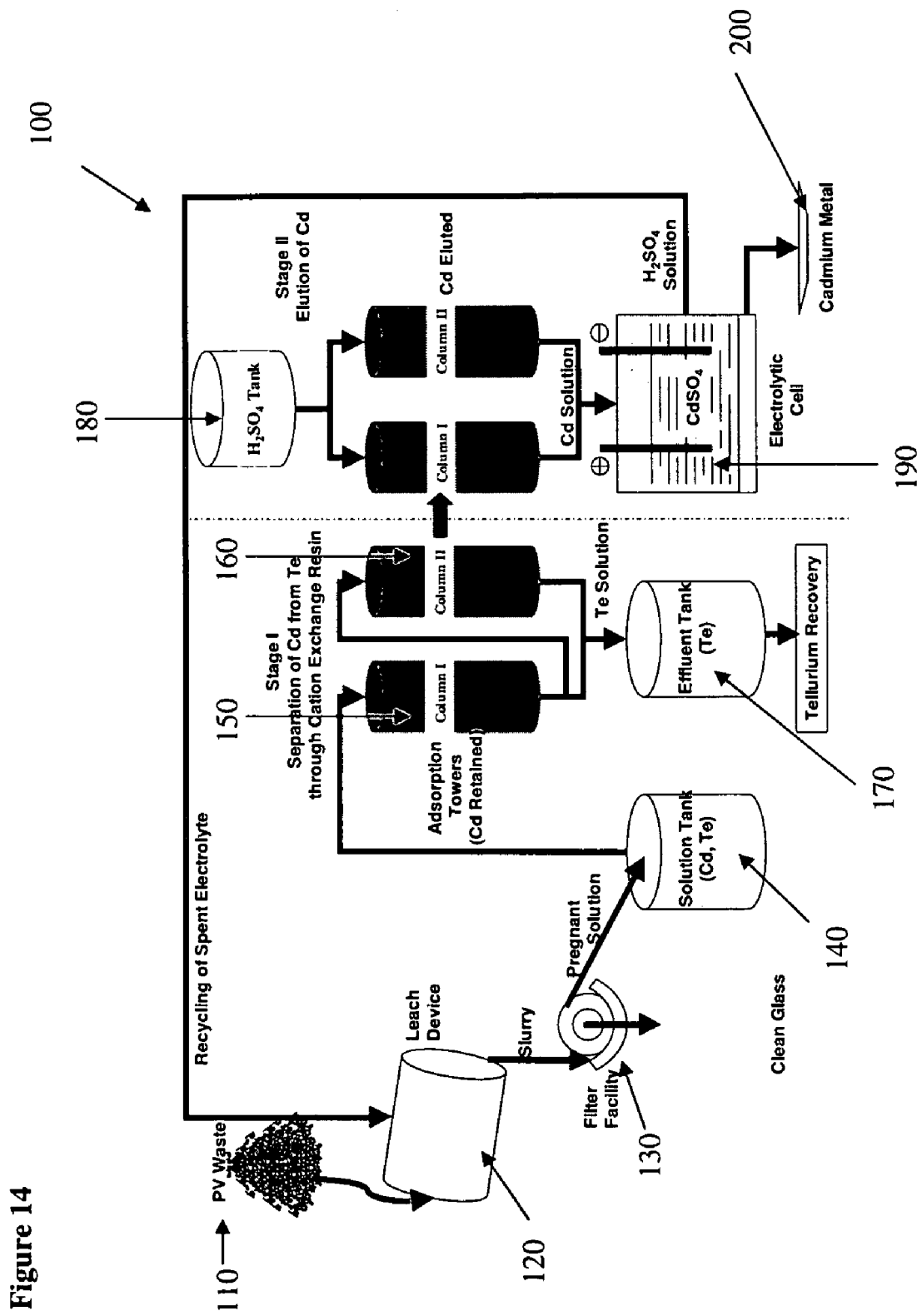
FIG. 14 is an illustration depicting a recycling system for photovoltaic devices.

In one embodiment, a system 100 is provided to perform the method of separating cadmium and tellurium from photovoltaic waste 110. Such a system is illustrated in FIG. 14. To reclaim tellurium and cadmium from photovoltaic waste 110, the modules are first fragmented by a crushing apparatus. The fragments can include cadmium, tellurium and glass and can then be loaded in any suitable manner into a leaching device 120. Prior to entry of the fragments, the leaching device can be loaded with a leaching agent which can include any acidic solution such as sulfuric acid. The leaching agent can also include hydrogen peroxide. To facilitate the leaching process, the fragments can be rotated within the leach device 120. This step can be performed at ambient temperature for a suitable amount of time.

After leaching, the liquid phase which can include cadmium and tellurium must be separated from the solid phase. The solid phase can include glass. This separation can be performed in a filter facility 130 which can include screens of different mesh sizes to retain the solid phase while allowing the liquid phase to pass through to the solution tank 140. The liquid phase can then be transferred into adsorption tower 150 which houses the first column of cation exchange resin. For a better separation of cadmium from tellurium, the liquid that flows through adsorption tower 150 can be transferred to adsorption tower 160. The tellurium-containing solution can be collected from either or both adsorption tower 150 and 160 into effluent tank 170. Tellurium may further be recovered by any suitable method from effluent tank 170. The cadmium that is retained in both adsorption tower 150 and 160 may be removed from the cation exchange resin by an acidic solution such as $H_2SO_4$ contained in a $H_2SO_4$ tank 180. The eluted cadmium can be collected in a collecting tank 190 that contains electrolytic cells to recover cadmium metal 200 from cadmium sulfate ($CdSO_4$).

Examples

Materials and Methods

Photovoltaic Device Samples

Samples measuring 6.3-cm by 30.5-cm, cut from commercial CdTe PV modules, and also fragmented manufacturing scrap were used in the leaching experiments. The average composition of the metals in the PV module samples (w/o connectors), was approximately 0.05 Cd wt %; 0.06% Te wt %; and, 0.01 Cu wt %. The leaching experiments were carried out at ambient temperature in a tumbling machine. The efficiency of two oxidative-leaching procedures in extracting cadmium and tellurium from PV glass; hydrogen peroxide leaching in sulfuric acid, and hydrogen peroxide leaching in hydrochloric acid was assessed. The strength of the acids ranged from 1.0-4.0 M. Kinetic studies of leaching were conducted in constant solid-to-liquid ratios at ambient temperature. The glass-solution mixture was sampled at regular intervals and the samples were then filtered through syringe filters with pore sizes of 0.20-0.70 µm. The filtrate was diluted with 5% $HNO_3$ and the solutions were analyzed for Te, Cd, and Cu using a Varian Liberty 100 Inductively Coupled Plasma (ICP) Emission Spectrometer.

Tellurium-Cadmium Containing Solutions

Solutions containing both tellurium and cadmium were prepared by dissolving known amounts of high purity (99.99%) CdTe powder in solutions of sulfuric acid and hydrogen peroxide of known volume and strength. The solutions were prepared using de-ionized water. They then were passed through a filter with a pore size of 0.70 µm to ensure that they were free of suspended particulates. The concentrations of tellurium and cadmium were determined using a Varian Liberty 100 Inductively Coupled Plasma (ICP) Emission Spectrometer. Frequent calibrations showed that the precision of the ICP measurements were ±1.0% for cadmium was and ±3.0% for tellurium.

Cation Exchange Resins

The cation-exchange resins used in this study were the AMBERLYST® 15 resin manufactured by the Rohm and Haas Company and the DOWEX® 50x8 resin manufactured by the Dow Chemical Company. Table 1 lists the properties of these resins, as reported by their manufacturers.

TABLE 1

Properties of cation ion exchange resins

| Properties | Amberlyst 15 Resin |
|---|---|
| Functional groups | $SO_3H$ |
| Physical form | Opaque beads |
| Ionic form as shipped | Hydrogen |
| Concentration of acid sites (contractual value) | ≧4.7 eq/kg |

TABLE 1-continued

Properties of cation ion exchange resins

| Properties | |
|---|---|
| Water content | ≦1.6% (H⁺ form) |
| Shipping weight | 610 g/L |
| Particle size (harmonic mean size) | 0.600 to 0.850 mm |
| Fines content (contractual value) | <0.300 mm: 1.0% maximum |
| Surface area | 53 m$^2$/g |
| Average pore diameter | 300 Å |
| Total pore volume | 0.40 cc/g |
| Swelling (dry form) | Dry to phenol: 38% |
| Shrinkage (wet form) | Water to dry: 37% |

Data source: Rohm and Haas Company, http://www.rohmhaas.com/ionexchange

Dowex 50W-X8 resin

| | |
|---|---|
| Functional groups | SO$_3$H |
| Ionic form as shipped | Hydrogen |
| Total capacity (nominal) | 5.1 meq/dry gram (1.7 meq/mL-resin bed) |
| Moisture contents | 50~56% by wet. |
| Size | 0.142~0.297 mm |
| Effective pore size | Medium |

Data source: Dow Chemical Company.

Before using, the resins were soaked in deionized water for 24 hours and rinsed several times with deionized water.

Batch Studies

Batch studies of sulfuric-acid strength, kinetics studies, and batch equilibrium isotherm studies were carried out in the same manner. In each type of studies, metal solutions containing tellurium and cadmium were prepared and transferred them into 250-mL wide-mouth polypropylene test bottles with screw closure caps using a FINNPIPETTE pipette (accurate to ±0.3% with a precision of 0.2%). Each bottle contained a known volume of the solution. A known amount of resin, AMBERLYST® 15 resin, was then added into each bottle. Afterwards, the bottles were shaken continuously at 100 rpm on an INNOVA 2100 platform shaker manufactured by New Brunswick Scientific Co. Inc. At certain intervals of contact time, the solution samples were withdrawn and filtered through 0.70 μm filters. The tellurium and cadmium concentrations of the filtered liquid samples were measured with an ICP Emission Spectrometer. The experiments were conducted in duplicate, and mean values were used in analyzing the data. The quantities of cadmium and tellurium adsorbed onto the resins at equilibrium ($q_e$, mg/g) were calculated using the mass balance equation:

$$q_e = (C_0 - C_e) V/M$$

where $C_0$ and $C_e$ are the initial concentration and equilibrium concentration of metals (mg/L), respectively, V is the volume of solution (L), and M is the resin mass (g).

Column Studies

The potential of commercial separation was studied using laboratory-scale ion exchange columns. These columns are made by graduated PERSPEX® resin of 34 mm inner diameter and 150 mm height. The PERSPEX® resin column was equipped with a bottom filtration device to prevent the escape of fine resin beads during processing. In general, any cation exchange resin may be used to remove positively-charged heavy metals ions in aqueous solution media. The AMBERLYST® 15 resin and the DOWEX® 50x8 cation-exchange resins were selected based on cost, range of operating pH, and adsorption capacity. In each column test, the cation exchange resin was first soaked in deionized water for at least 12 hours to ensure that the resin was fully swelled prior to use. The column was then loaded with 100 mL of the swelled resin. The influent solution was prepared by the dissolution of CdTe powder with sulfuric acid and hydrogen peroxide. The matrix solution was 0.5M $H_2SO_4$ with approximately 1100 ppm of tellurium and 1000 ppm of cadmium. The prepared influent solution, containing both cadmium and tellurium, was passed downward through the column at a fixed flow rate. A total of ~2.0 to 4.0 liters of influent solution was used in each column study. The downstream effluent was collected at different fractions with each fraction measuring about one bed volume (100 mL). The flow rate of the solution was kept at 3 to 6 bed volumes per hour (BV/hr), which was equivalent to 300-600 mL/hr. Samples of solution were taken from each fraction of the effluent and were analyzed using ICP for cadmium and tellurium.

Results:

Selection of Leaching Acid

Figure 1B:
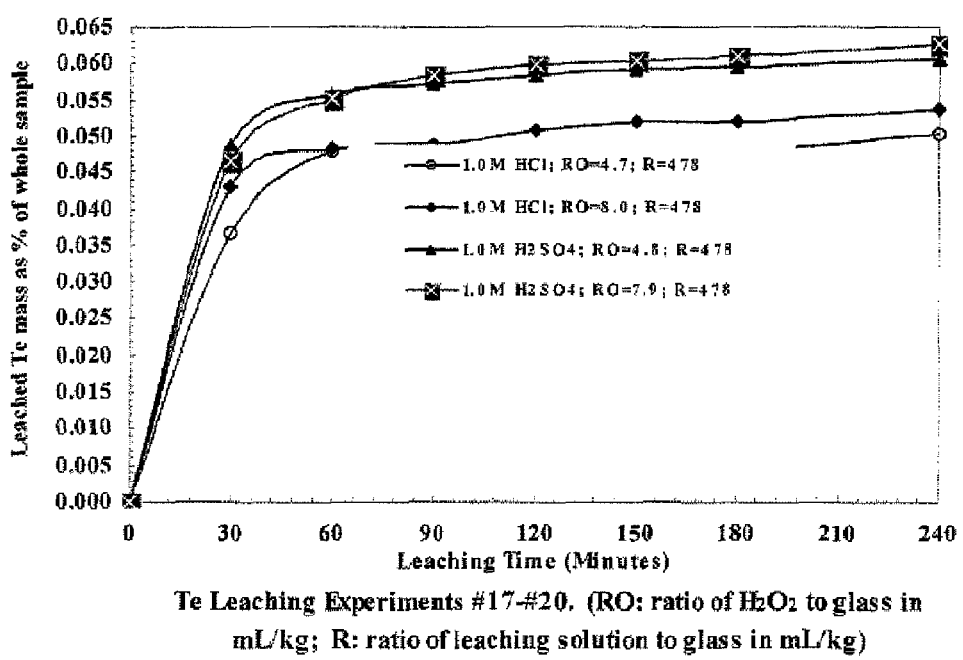
FIG. 1B is a graph depicting the comparison of the efficiency of leaching tellurium with $H_2SO_4/H_2O_2$ and $HCl/H_2O_2$ solutions.

The experiments demonstrated that at the same strength, a sulfuric-acid solution extracted more cadmium and tellurium than a hydrochloric acid solution. In many instances, cadmium was almost completely leached within one hour, as shown in FIG. 1A, where the leached mass is depicted as the percentage of the mass of the sample (mainly glass). However, leaching of tellurium was not completed within one hour, and especially with hydrochloric acid the extraction of tellurium was far from complete (FIG. 1B). Based on these results, sulfuric acid was chosen as the acid leaching agent and further studies were limited to the $H_2SO_4/H_2O_2$ system. The effect of the following parameters was then investigated: the strength of the acid, the ratio of hydrogen peroxide volume to the weight of the PV module (mainly glass), and the ratio of the volume of the leaching solution to the weight of the PV modules.

Effects of the Acid's Strength

Figure 2A:
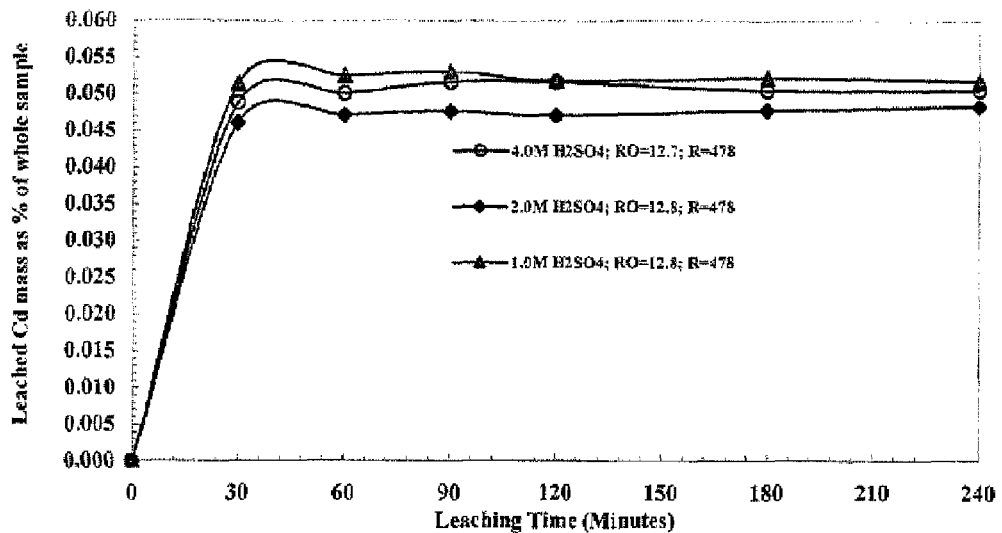
FIG. 2A is a graph depicting the effects of acid strength on the efficiency of leaching Cd.
Figure 2B:
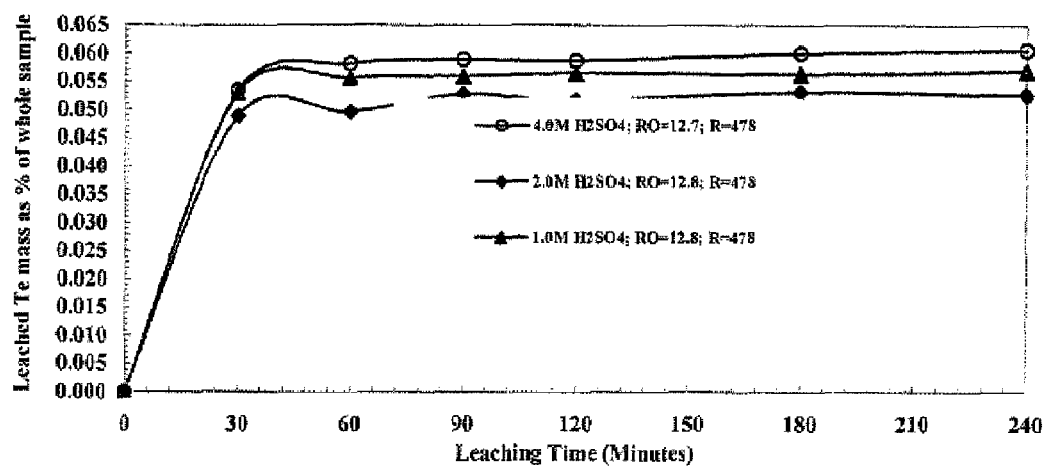
FIG. 2B is a graph depicting the effects of acid strength on the efficiency of leaching Te.

The PV modules were leached at ambient temperature with concentrations of sulfuric aid varying from 1.0-4.0 M, keeping a liquid/solid ratio of ~478 mL/kg-glass. A higher strength acid may not be necessarily advantageous for leaching cadmium from glass substrates. With the hydrogen peroxide ratio, Ro, fixed at ~12.8 mL/kg-glass, a 1.0 M sulfuric acid solution was equally effective as a 4.0 M sulfuric-acid solution in removing cadmium (FIG. 2A). Within the first half hour, cadmium was nearly completely leached out into the solution, and more than 80% of tellurium was dissolved. Stronger sulfuric acid initially appears to leach Te quicker than a weaker solution (FIG. 2B). During the first 90 minutes, the amount of tellurium leached with 4.0 M sulfuric acid was the highest among all tests, but with time the effectiveness of the 1.0 M acidic solution equaled that of the 4.0 M acidic solution.

Effects of the Amount of Hydrogen Peroxide

Figure 3A:
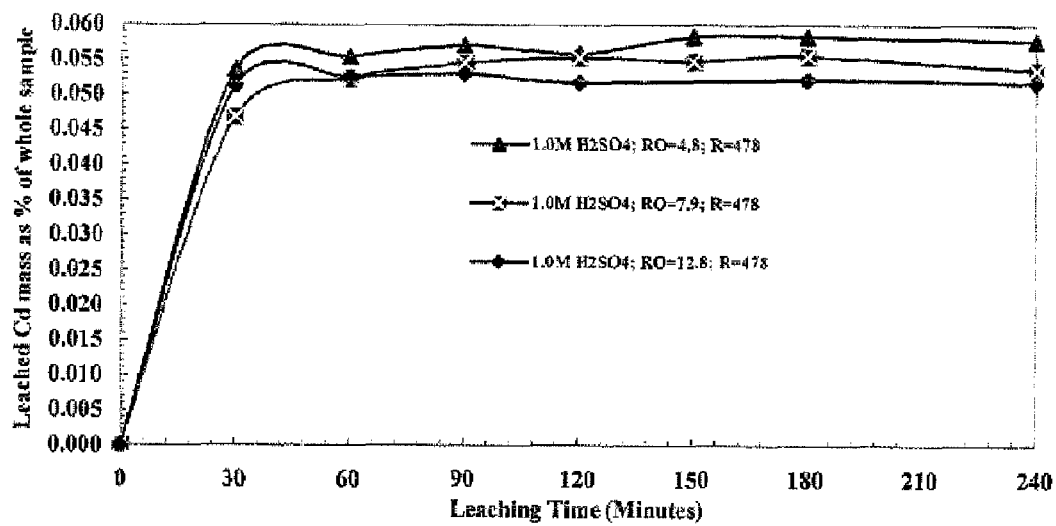
FIG. 3A is a graph depicting the effects of different concentrations of hydrogen peroxide on the efficiency of leaching Cd.
Figure 3B:
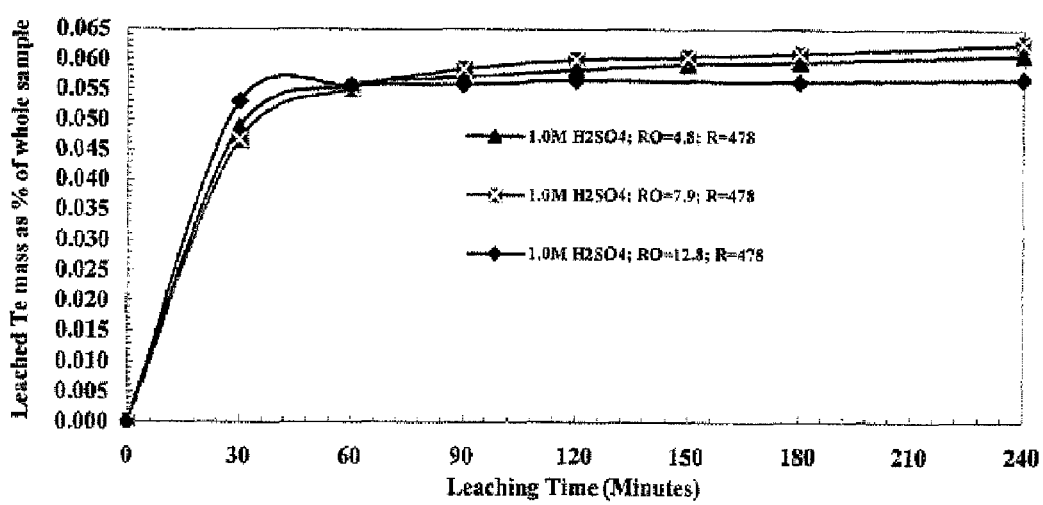
FIG. 3B is a graph depicting the effects of different concentrations of hydrogen peroxide on the efficiency of dissolving Te.

Hydrogen peroxide, used in the leaching process to oxidize tellurium, may not directly affect the efficiency of extracting cadmium; nevertheless, it played an important role in the leaching of CdTe. The minimum amount of hydrogen peroxide in dilute (1.0 M) solutions of sulfuric acid, required to attain the maximum extraction of cadmium and tellurium. This occurred in a 4.8 mL solution per kg of glass, corresponding to about 3.5 times the stoichiometric ratio of Te to $H_2O_2$. Keeping the $H_2O_2$ amount at a minimum improved the efficiency of cadmium extraction, especially at leaching times longer than 120 minutes. The leaching efficiencies of solutions with different concentrations of hydrogen peroxide are shown in FIGS. 3A and 3B as a function of time.

Separation of Metals by Ion Exchange

Solutions were prepared containing tellurium and cadmium at the concentrations obtained from the leaching experiments by dissolving known amounts of high purity (99.99%) CdTe powder in solutions of sulfuric acid and hydrogen peroxide. Two types of cation-exchange resins were selected for testing based on their selectivity, pH range, and cost.

During leaching with aqueous solutions of sulfuric acid and hydrogen peroxide, Cd and Te were solubilized into the liquid phase according to the following reactions:

$$CdTe + H_2O_2 + H_2SO_4 = Cd^{2+} + SO_4^{2-} + 2H_2O + Te \quad (1)$$

$$Te + 2H_2O_2 + 2H_2SO_4 = 4H_2O + Te^{4+} + 2SO_4^{2-} \quad (2)$$

$$Te + 3H_2O_2 = H_6TeO_6 \quad (3)$$

$$CdS + H_2O_2 + H_2SO_4 = Cd^{2+} + SO_4^{2-} + 2H_2O + S \quad (4)$$

$$Te^{4+} + H_2O_2 + 4H_2O = H_6TeO_6 + 4H^+ \quad (5)$$

The dissolved cadmium exists predominantly as uncomplexed $Cd^{2+}$, whereas tellurium (IV) may exist in the form of $Te^{4+}$ and $TeO(OH)^+$ depending on the acidity of the solution. The higher the acidity, the more likely it is that tellurium is in the form of $Te^{4+}$. Tellurium (VI) would be bonded as $H_6TeO_6$ in acidic media because $H_6TeO_6$ is a weak acid; therefore, free $Te^{6+}$ ions are unlikely to exist in the solution. In the present experiments, the only possible cations occurring in the sulfuric-acid solution were $Cd^{2+}$, $H^+$, $Te^{4+}$, and $TeO(OH)^+$.

The following reversible reactions are possible on cation-exchange resin:

$$2RSO_3^-H^+ + Cd^{2+} \leftrightarrow (RSO_3^-)_2Cd^{2+} + 2H^+ \quad (6)$$

$$4RSO_3^-H^+ + Te^{4+} \leftrightarrow (RSO_3^-)_4Te^{4+} + 4H^+ \quad (7)$$

$$RSO_3^-H^+ + TeO(OH)^+ \leftrightarrow RSO_3^-TeO(OH)^+ + H^+ \quad (8)$$

Accordingly, low acidity will favor forward reactions whereas high acidity will favor the backward ones. Although all these adsorption reactions might take place, their extent (completeness) for a specific cation species is very different due to the resins' different affinity and selectivity to positively charged ions, which is the basis for the separation of ions in the solution.

The above system was studied in both batch and column experiments. The batch experiments enabled the optimization of acid strength, and the determination of the kinetics of the separation processes.

Figure 4:
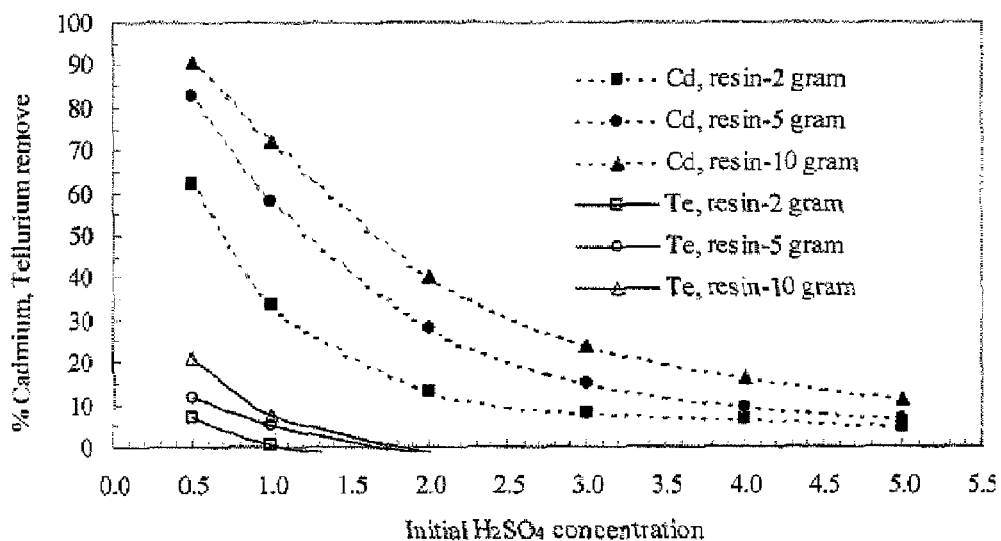
FIG. 4 is a graph depicting the effect of $H_2SO_4$ concentrations on cadmium adsorption by Resin A.

As evident from the reversible adsorption reactions (5)-(7), the concentration of $H^+$ (i.e., the strength of sulfuric acid), plays an important role in adsorption. As the concentration of $H^+$ increases, positively charged metal ions compete less and less for exchange on the resin; FIG. 4 (where initial metal concentrations were Cd-1060 ppm; Te-1240 ppm in a 100 mL solution) shows this dependence. A very low percentage of cadmium was removed at high $H_2SO_4$ concentration. For instance, at an initial concentration of 5M $H_2SO_4$, less than 10% of the cadmium, and no tellurium was adsorbed. The low adsorption may reflect the competition between $H^+$ and metallic cations. With decreasing $H_2SO_4$ strength in the initial solution, more cadmium was exchanged to the resin phase. The highest rate of increase occurred in the range of 0.5M to 2M. At the lowest strength, with 10 grams of resin, about 91% of cadmium and 21% tellurium was removed in batch experiments. Cadmium ions compete with tellurium for resin sites, but resin has a much higher affinity for the former. Concentrations of sulfuric acid below 0.5 M extracted Te and Cd poorly, and, therefore, were not used. The kinetics of cadmium and tellurium adsorptions for Resin A at the optimum 0.5M $H_2SO_4$ concentration at short intervals over 12 hours.

These studies also demonstrate that the amount of resin affects the percentage of cadmium removed. FIG. 4 shows that to remove more than 90% of 1060 ppm of cadmium from 100 mL solution with 0.5M sulfuric acid, a minimum of 10 grams of AMBERLYST® 15 resin is required at equilibrium. In comparison, only 83% and 62% of cadmium was removed when the amount of the resin was 5 grams and 2 grams, respectively. As expected, the equilibrium concentrations of cadmium and tellurium in the liquid phase decrease with the increase in the amount of resin because the number of active $H^+$ sites increases. However, this effect is not linear in high $H_2SO_4$ concentration solutions. As shown in FIG. 4, in 5.0M $H_2SO_4$, the efficiency of cadmium removal was 11%, 7%, and 5% when the resin level was 10 grams, 5 grams, and 2 grams, respectively.

Figure 6A:
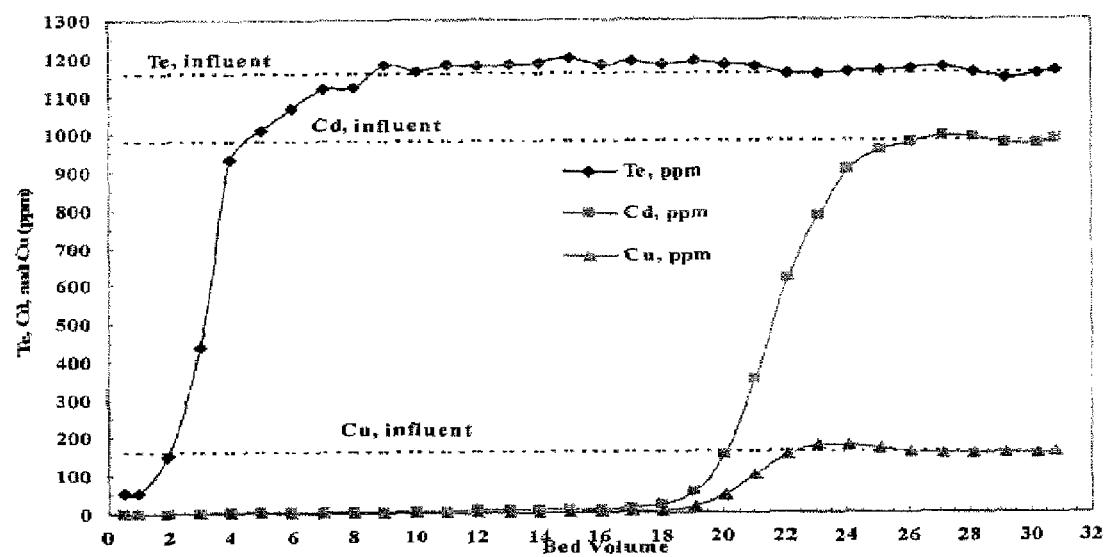
FIG. 6A depicts the separation plots of cadmium, copper and tellurium
Figure 6B:
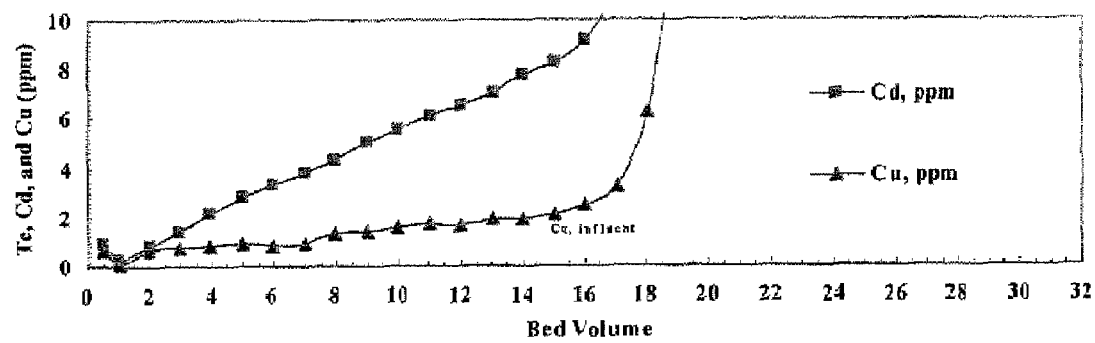
FIG. 6B depicts the separation plots of cadmium and copper.

In addition to the batch studies, column experiments were conducted to study the phase and shape of the breakthrough curves of cadmium and tellurium, and to evaluate the possibility of continuous flow separation. The effluent solution at different volume fractions was collected and analyzed by ICP for cadmium, tellurium, and copper. In the batch studies, only Resin A was used. In the column studies, both resins A and B were tested. Resin B exhibited slightly higher leakage for both cadmium and copper than resin A. FIG. 6 (where influent concentrations were Te-1158.93 ppm, Cd-979.84 ppm, Cu-157.85 ppm) shows such curves for tellurium and cadmium from an experiment on resin B, in which sixteen minutes was the nominal resident time of the influent solution in the resin column. Tellurium broke through the column quickly, and the column took approximately 800 mL (8 bed volumes) before becoming exhausted with tellurium. On the other hand, the cadmium was adsorbed for substantially longer, not achieving breakthrough until 18 bed volumes, and reaching exhaustion after 26 bed throughput volumes. The separation of cadmium from tellurium was fairly complete, as shown by the ICP analysis of the effluent fractions. Thus, in each of the effluent fractions collected before the passage of 16 bed volumes (1600 mL), cadmium concentration was below 10 ppm showing that at least 99% of it was removed by the resin, whereas tellurium was retained in the solution. Mass balance calculations showed that 2.1 grams of cadmium were exchanged to 100 mL of swollen resin.

Figure 7A:
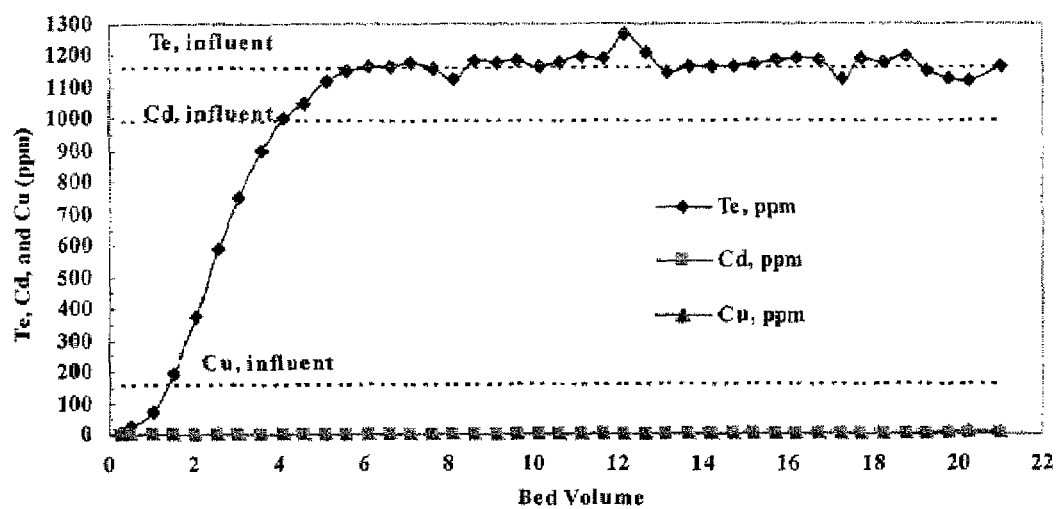
FIG. 7A depicts the separation plots of cadmium, copper and tellurium
Figure 7B:
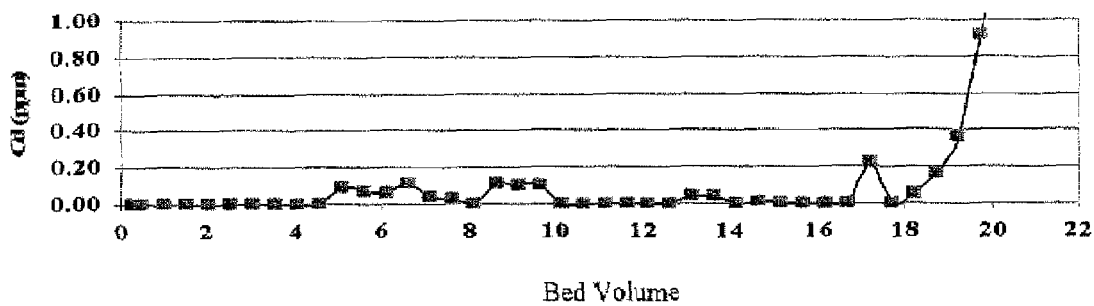
FIG. 7B depicts the separation plots of cadmium.

Column experiments using the resin A showed slightly better separation effectiveness. When two ion-exchange columns with resin A were used in series (resin volume of 100 mL each), the removal of cadmium reached 99.99% or better (FIG. 7), even though the flow rate was increased compared with the single column experiments, which subsequently decreased the resident time in each column. The total residence times through the two columns was 22 minutes. The flow rate of the influent solution was controlled at 750 mL/hr and 4200 mL of influent solution was passed through the two columns. Influent concentrations were Te-1150 ppm and Cd-989 ppm. The cadmium concentrations in the first 3400 mL of the effluent solution fractions were often below the detection limit of ICP (i.e., <1.5 ppb). Throughout the range of 0-3800 mL, the highest measured Cd concentration was 0.5 ppm, and the average concentration was 0.04 ppm; in the range 0-3300 mL, the average concentration was 0.02 ppm, corresponding to a 99.998% removal of Cd. Overall, the solution fractions collected before breakthrough were basically free of cadmium, and, therefore, high purity tellurium could be recovered subsequent to this separation.

Different leaching solutions were evaluated and leaching under standard ambient conditions with dilute sulfuric acid/hydrogen peroxide solution was found to be equal to, or better than the more costly (i.e., concentrated) solutions and more expensive systems. The optimized acid strength was 1.0 M of $H_2SO_4$ with a liquid-to-solid ratio of 476 mL/kg, and ratio of $H_2O_2$ to glass of 4.8.

The feasibility of removing and separating cadmium from tellurium in acidic media was studied using two different cation-exchange resins. Both resins showed a much higher affinity to cadmium ions than to tellurium and both effectively separated cadmium from tellurium in the above column studies; however, one column was slightly better than the other in our tests. Experiments with two columns in a series removed more than 99.99% of the cadmium, while 90% to 96% of the tellurium remained in the solution.

Batch Kinetic studies

Figure 8A:
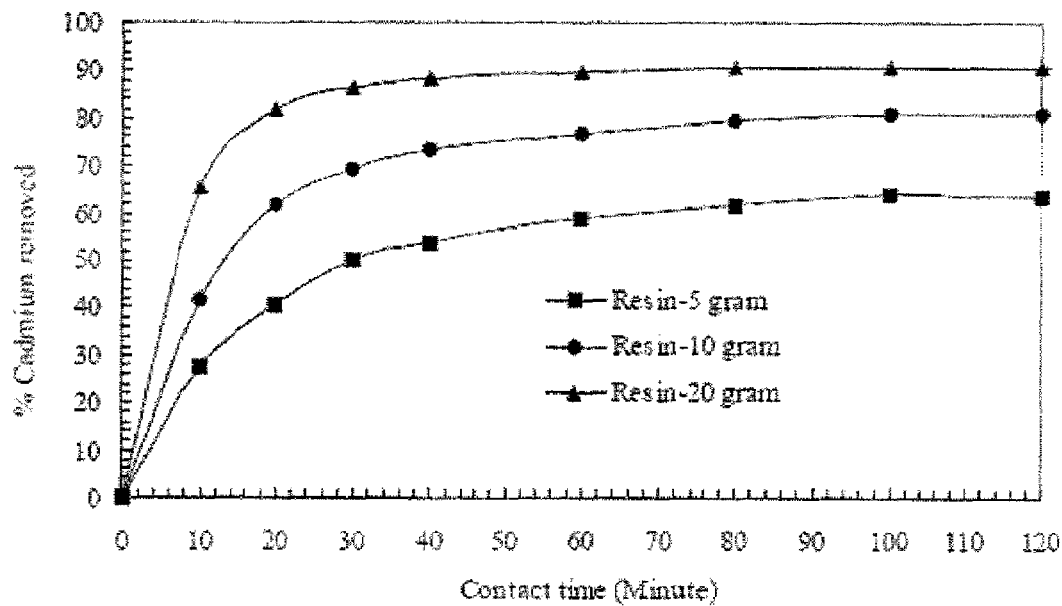
FIG. 8A is a graph depicting cadmium removal percentage vs. time at initial $H_2SO_4$ concentration of 0.5 M.
Figure 8B:
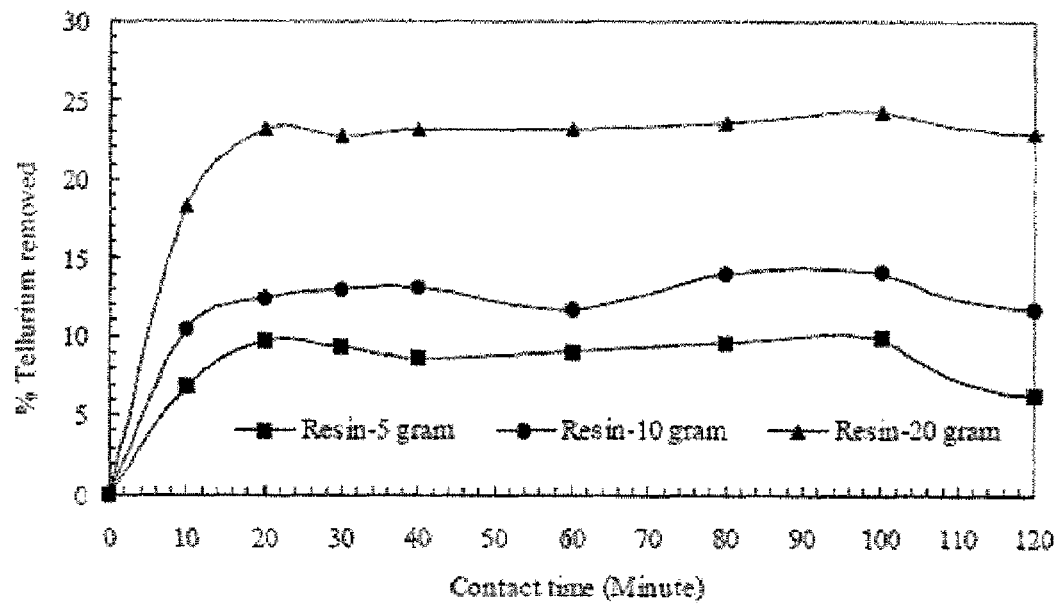
FIG. 8B is a graph depicting tellurium removal percentage vs. time at initial $H_2SO_4$ concentration of 0.5 M.

The batch kinetic studies were conducted with the metal solutions containing initial concentrations of Cd 1090 ppm and Te 1270 ppm in 0.5M sulfuric acid media. The amounts of AMBERLYST® 15 resin used were 5 grams, 10 grams, and 20 grams respectively. In each experiment, a total of 240 mL metal solution was used. The solution samples were withdrawn at contact times of 10, 20, 30, 40, 60, 80, 100, 120, and 720 minutes. FIG. 8A (initial metal concentrations were Cd-1090 ppm; Te-1270 ppm in a 240 mL solution) and FIG. 8B (initial metal concentrations were Cd-1090 ppm; Te-1270 ppm in a 240 mL solution) plot the ion exchange kinetics for separating cadmium from tellurium with different amounts of AMBERLYST® 15 resin at an initial $H_2SO_4$ concentration of 0.5M. From FIGS. 8A and 8B, significant and rapid adsorption of cadmium took place within first 20 minutes, beyond which, there was only a marginal increase in adsorption. Within 2 hours, the concentrations of cadmium in the solutions reached a steady state, indicating that the ion exchange reactions reached equilibrium. The adsorption equilibrium of tellurium was well established within less than 20 minutes. Both the Cd and Te concentrations remained constant and this was confirmed by continuing sampling and analysis up for up to 12 hours.

As previously discussed, tellurium exists in the forms of Te(IV) and Te(VI) in sulfuric acid solutions. The only possible cations of tellurium in acidic media are Te(IV) since Te(VI) cannot be positively charged. Moreover, by using $H_2O_2$ in the leaching process, a large fraction of tellurium was oxidized to Te(VI). Consequently, only small amount, if any, of positively charged Te(IV) may exist in the studied solutions. When in contact with the AMBERLYST® 15 resin, positively charged Te(IV) ions, if any, would compete with cadmium ions. The resin has a much higher affinity for the cadmium, and the removal percentage of cadmium was much higher than that of tellurium. The two metals were completely separated in the column studies.

Figure 5:
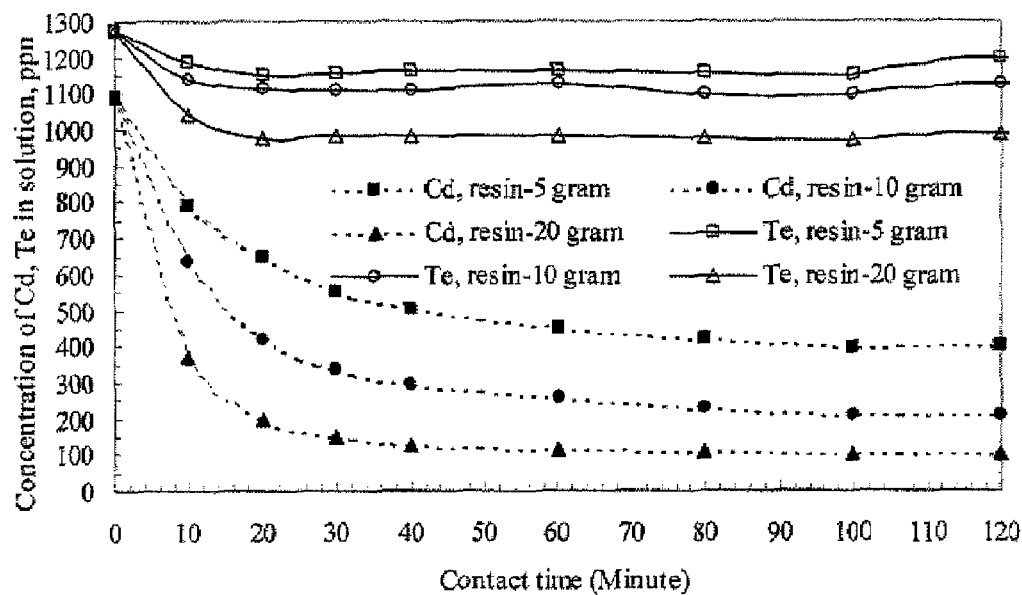
FIG. 5 is a graph depicting the overall performance of the resin by plotting cadmium concentration versus contact time with 0.5M $H_2SO_4$ media.

The mechanism of ion-exchange involves diffusion through a liquid film around the resin particle, and diffusion within the particle. The former is the rate-controlling mechanism at low concentrations, and the latter at high concentrations. However, in both cases, the size of the resin particle also is a determining factor. As shown in FIG. 5 (where initial metal concentrations were Cd-1090 ppm; Te-1270 ppm in a 240 mL solution), the kinetics of cadmium and tellurium adsorptions for the AMBERLYST® 15 resin is at its optimum 0.5M $H_2SO_4$ concentration at short intervals over 12 hours.

Several mathematical models have been used to describe the adsorption kinetics of resin-solution systems. The most popular and frequently used models are Lagergren's first order model (Lagergren, S., Zur theorie der sogenannten adsorption geldster stoffe. Kungliga Svenska Vetenskapsakademiens. *Handlingar, Band* 24, No. 4, 1-39 (1898); Kapoor et al. *Bioresource Technology*, 70(1), 95-104 (1999)) and Ho's pseudo second-order model (Ho et al., *Environmental Technology*, 17(1), 71-77 (1996)).

The Lagergren's first order reaction model is expressed as follows (Lagergren, S., Zur theorie der sogenannten adsorption geldster stoffe. Kungliga Svenska Vetenskapsakademiens. *Handlingar, Band* 24, No. 4, 1-39 (1898); Kapoor et al. *Bioresource Technology*, 70(1), 95-104 (1999)):

$$\ln(q_e - q_t) = \ln(q_e) - K_L t \qquad (9)$$

The above equation can be rearranged as follows:

$$\ln(1 - q_t/q_e) = -K_L t \qquad (9\text{-a})$$

$$q_t = q_e(1 - \exp(-K_L t)) \qquad (9\text{-b})$$

Where, $K_L$ is the Lagergren's rate constant for adsorption $(\text{min}^{-1})$, $q_e$ is the amount of metal ions adsorbed at equilibrium (mg/g), and $q_t$ is the amount of metal ions adsorbed at any given time t(mg/g).

Ho developed a pseudo-second-order kinetic expression for the competitive sorption systems of heavy metal ions by sphagnum moss peat (Ho et al., *Environmental Technology*, 17(1), 71-77 (1996)). It is expressed as follows:

$$t/q_t = 1/(2Kq_e^2) + t/q_e \qquad (10)$$

This can be rearranged to the form:

$$q_t = (2Kq_e^2 t)/(1 + 2Kq_e^2 t) \qquad (10\text{-a})$$

Where K is pseudo second order rate constant for adsorption, (g/(mg–min)), $q_e$ is the amount of metal ion adsorbed at equilibrium (mg/g), and $q_t$ is the amount of metal ions adsorbed at any given time t (mg/g).

Figure 9:
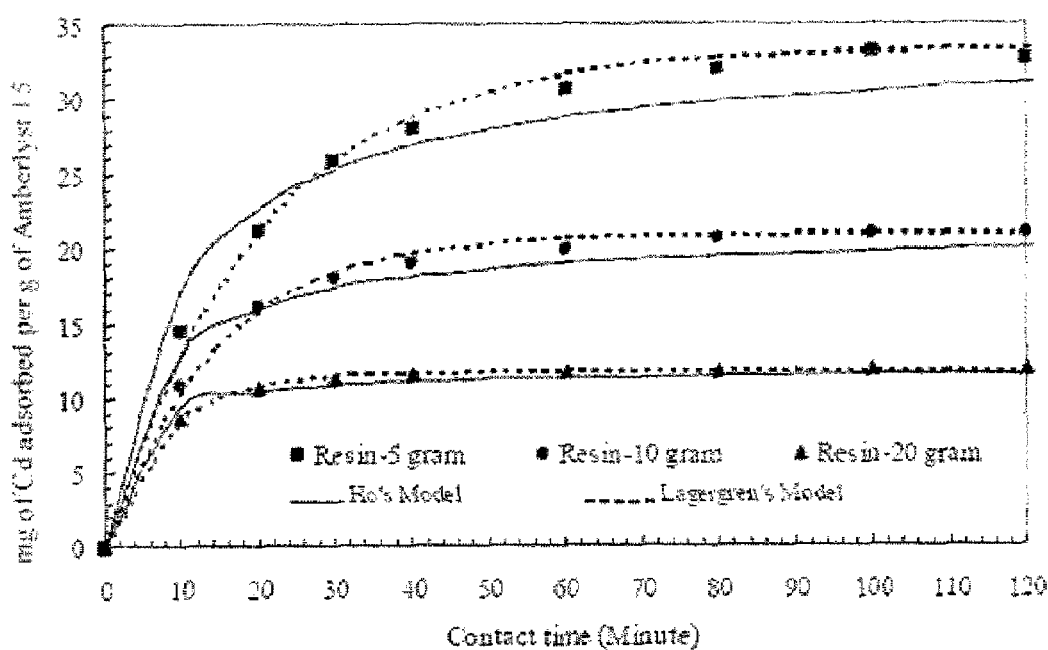
FIG. 9 is a graph depicting Lagergren first-order reaction model and Ho's pseudo-second-order reaction model plot for adsorption of cadmium on AMBERLYST® 15 resin.
Figure 10A:
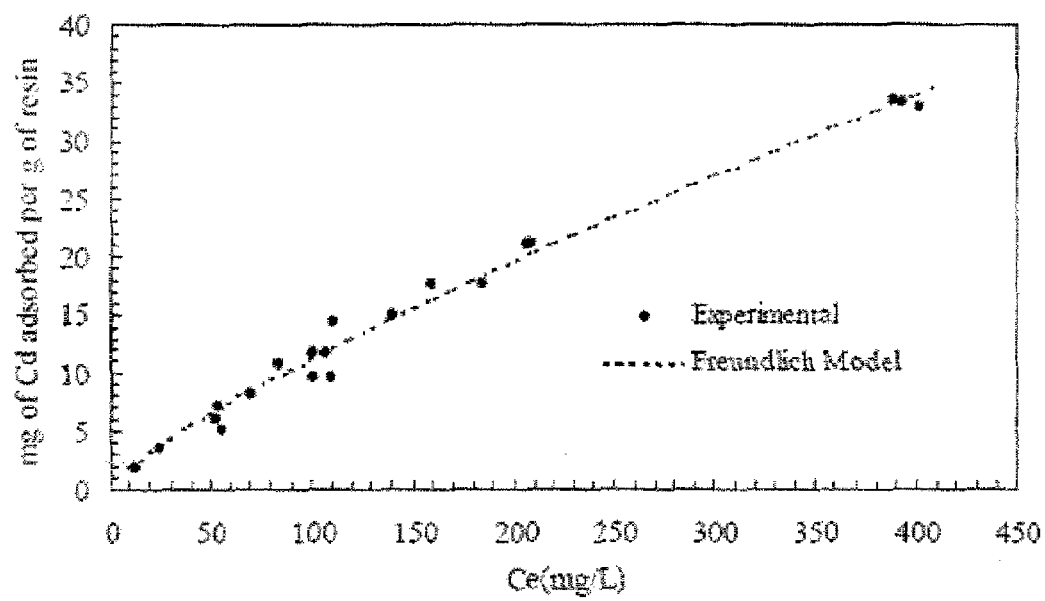
FIG. 10A is a graph depicting the Freundlich model plot for ion exchange of Cd on AMBERLYST® 15 resin.

The batch kinetic study data for optimum initial $H_2SO_4$ of 0.5M was fitted to both models by nonlinear regression analysis using the software package ProStat (Version 3) for Windows. The analysis indicates that both models adequately described the kinetic data at the 95% confidence level. The Lagergren first-order model described the kinetic data with higher coefficient of determination (COD) and Correlation ($R^2$) values than Ho's pseudo-second-order model. FIGS. 9 and 10A show the kinetics of cadmium adsorption on AMBERLYST® 15 resin for these models. As shown in these figures, Lagergren's $1^{st}$ order model slightly overestimates the kinetics of cadmium adsorption, whereas Ho's pseudo $2^{nd}$ order expression slightly underestimates them. The equations for cadmium adsorption on AMBERLYST® 15 resin for both models are listed in Table 2.

TABLE 2

Comparison of two models for cadmium adsorption on Amberlyst 15.

| Resin amount, g | Model type | Model equation | COD | $R^2$ |
|---|---|---|---|---|
| 5 | $1^{st}$ order | $q_t = 33(1 - e^{-0.052t})$ | 0.997 | 0.998 |
|  | Pseudo $2^{nd}$ order | $t/q_t = 1/[2(0.0016)(33^2)] + t/33$ | 0.973 | 0.991 |
| 10 | $1^{st}$ order | $q_t = 21(1 - e^{-0.072t})$ | 0.998 | 0.999 |
|  | Pseudo $2^{nd}$ order | $t/q_t = 1/[2(0.0037)(21^2)] + t/21$ | 0.977 | 0.992 |

TABLE 2-continued

Comparison of two models for cadmium adsorption on Amberlyst 15.

| Resin amount, g | Model type | Model equation | COD | $R^2$ |
|---|---|---|---|---|
| 20 | 1$^{st}$ order | $q_r = 12(1-e^{-0.13t})$ | 0.999 | 0.999 |
|  | Pseudo 2$^{nd}$ order | $t/q_r = 1/[2(0.015)(12^2)] + t/12$ | 0.989 | 0.996 |

The cadmium adsorption-rate constants increase significantly as the dosages of resin increase. For the Lagergren model, the calculated first-order reaction constant was 0.052 min$^{-1}$, 0.072 min$^{-1}$, and 0.13 min$^{-1}$ respectively, with 5 grams, 10 grams, and 20 grams of resin. These findings are very close to the first-order kinetic rate constants reported by Mathialagan and co-workers of 0.059 min$^{-1}$ adsorption on vermiculite (Mathialagan et al., *Separation Science and Technology*, Vol. 38, No. 1, pp. 57-76 (2003)) and 0.055 min$^{-1}$ on perlite (Mathialagan et al., *Journal of Hazardous Materials* B94:291-303 (2002)).

Equilibrium isotherm Studies

After determining the optimum strength of sulfuric acid and the adsorption equilibrium time, equilibrium isotherm studies were conducted at room temperature (23±1° C.) by varying the initial concentrations of tellurium and cadmium. A fixed 100 mL liquid volume was used in each experiment. Solutions of different Cd and Te concentrations were prepared by diluting a stock of 1040 ppm Cd and 1160 ppm Te in 0.5M sulfuric acid, with virgin 0.5M $H_2SO_4$ solution. Table 3 lists the concentrations of the prepared solutions. 5 grams of AMBERLYST® 15 resin were added to 100 mL of each prepared solution and shaken for 24 hours, which was sufficient to reach equilibrium. A control solution with 100 mL of 0.5M sulfuric acid solution, but without the metals, was also mixed and shaken with 5 grams of the resin to determine the possibility of leaching of tellurium and cadmium from the resin. Both tellurium and cadmium concentrations were measured at the end of the adsorption.

TABLE 3

Initial concentrations of metal solutions

| Bottle | Dilution factor (%) | Concentration of metals (ppm) | |
|---|---|---|---|
|  | % | Te | Cd |
| 1 | 10 | 117 | 104 |
| 2 | 20 | 233 | 208 |
| 3 | 40 | 466 | 416 |
| 4 | 60 | 699 | 625 |
| 5 | 80 | 933 | 833 |
| 6 | 100 | 1160 | 1040 |

The ion exchange equilibrium for metal ions can be conveniently analyzed by the ion-exchange isotherm, which is an equilibrium plot of the concentration of the exchanging ion in solution against the concentration of the same ion in the solid exchanger at constant temperature (Ahmed et al., Separation and Purification Technology, 13:57-64 (1998)). Two nonlinear mathematical models are widely used in describing ion-exchange isotherms: Freundlich's model and Langmuir's model.

The Freundlich's model (Weber, W. J., Jr., Physicochemical Process for Water Quality Control; John Wiley and Sons, Inc., New York, 199-260 (1972)) is often written as:

$$q = K_f D_e^{1/n} \quad (11)$$

Where, q is amount of metal ions adsorbed per unit of weight of resin (mg/g); $K_f$ is an equilibrium constant indicative of adsorption capacity; n is the adsorption equilibrium constant whose reciprocal is indicative of adsorption intensity; $C_e$ is concentration of metal ions in bulk solution at equilibrium (mg/L).

The Langmuir model (Langmuir, L, *Journal of American Chemical Society*, Vol. 40, 1361 (1918)) is mathematically written as follows:

$$q = (q^0 b C_e)/(1 + b C_e) \quad (12)$$

Where, $q^0$ is amount of solute adsorbed per unit weight of resin in forming a complete monolayer on the surface (mg/g); b is constant related to the energy or net enthalpy of adsorption; $C_e$ is concentration of metal ions in bulk solution at equilibrium (mg/L).

The experimental results were analyzed using the software package ProStat (Version 3). The adsorption data obtained was best fitted with the Freundlich isotherm model. The obtained equation is $q=(0.29)C_e^{1/1.26}$. The constants obtained with this model were statistically significant at 95% confidence level. The COD is 0.985, and the $R^2$ is 0.992. FIG. 5(a) shows plots of the Freundlich model as well experimental results for cadmium adsorption on the AMBERLYST® 15 resin.

Figure 10B:
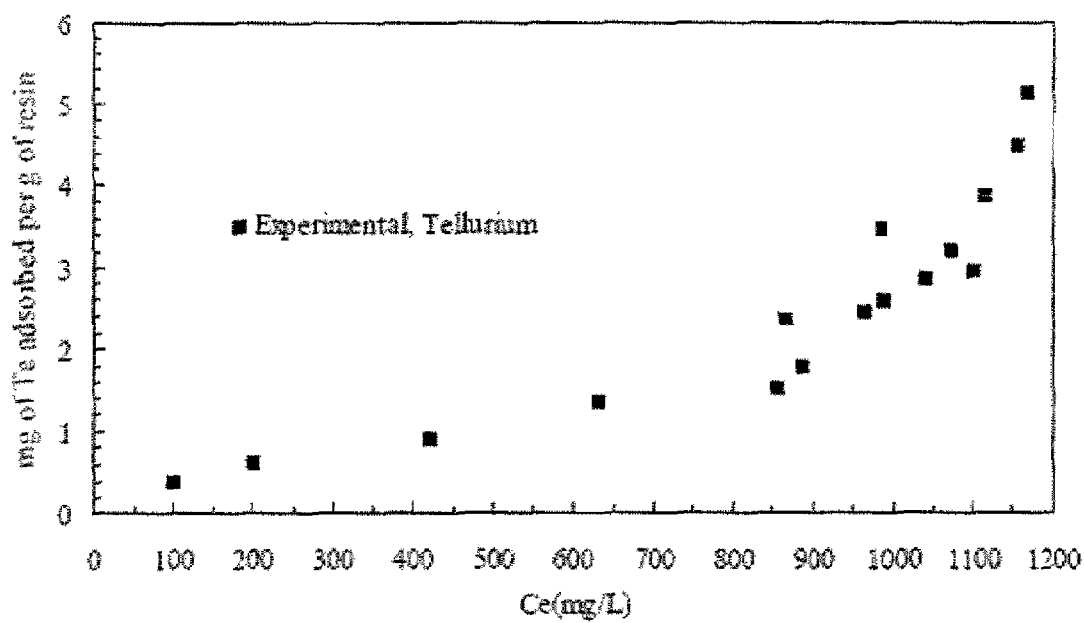
FIG. 10B is a graph depicting the equilibrium isotherm of tellurium on AMBERLYST® 15 resin.

The equilibrium isotherm of tellurium was also investigated and the equilibrium plot of the concentrations of the tellurium in solution against the concentrations of the tellurium in the resin is shown in FIG. 10B. The adsorption of tellurium on the resin did not fit the considered equilibrium isotherm models. This suggests that the tellurium may be adsorbed only physically onto the resin.

The experimental results also showed that, in the present batch study conditions, AMBERLYST® 15 resin had an adsorption capacity of 33 mg/g-resin for cadmium and 5 mg/g-resin for tellurium, which corresponds to 16% of the sulfonic acid sites of the resin. The equilibrium isotherm studies revealed that the selectivity of AMBERLYST® 15 to cadmium is much higher than to tellurium. This makes it possible to separate these two metals using a cation exchange resin column.

Column Studies

Figure 11:
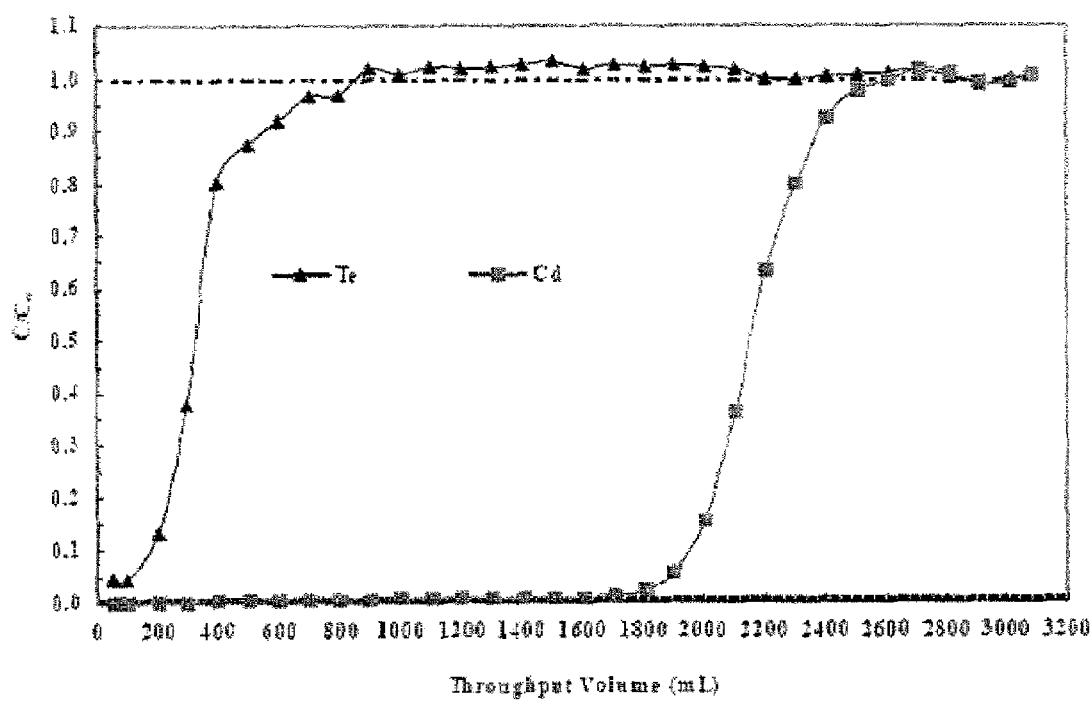
FIG. 11 is a graph depicting the removal of cadmium from cadmium and tellurium-containing solution using DOWEX™ 50X8 resin.

The column studies were conducted to elucidate the shape of the breakthrough curves of cadmium and tellurium. In the column studies, the effluent solution was collected at different volume fractions and was analyzed by ICP for cadmium and tellurium. The efficiency of adsorbing cadmium and tellurium is presented by breakthrough curves showing concentration ratios C/$C_0$ as a function of throughput volumes. C is the instantaneous concentration of effluents, and $C_0$ is the initial concentration of influent. FIG. 11 (resin volume was 100 mL, influent concentrations were Te-1160 ppm; Cd-980 ppm respectively and solution flow rate was 500 mL/hour) shows such curves for tellurium and cadmium from an experiment on the resin, DOWEX® 50x8. In this test, the nominal resident time of the influent solution in the resin column was 16 minutes. It is shown that the tellurium breaks through the column almost immediately (at 50 mL, 0.5 bed volumes) after feeding and the column took approximately 800 mL (8 bed volumes) before being completed exhausted with tellurium.

On the other hand, the cadmium was adsorbed for a substantial period of time, not achieving breakthrough until 1800 mL, and reached exhaustion after 2600 mL of throughput volume. Separation of cadmium from tellurium was fairly complete, as shown by the ICP analysis of the effluent fractions. In each of the effluent fractions which were collected prior to 1600 mL, the cadmium concentration was below 10 ppm showing that at least 99% of cadmium was removed by the resin, whereas tellurium was retained in the solution.

The steep increase in the concentrations of Cd and Te metals in the effluent fractions indicates that a relatively small volume of solution would cause the column to reach complete exhaustion of the resin from the breakthrough point, or, in another words, very short mass transfer zone (MTZ). Mass balance calculations show that 2.1 grams of cadmium were exchanged to 100 mL of swollen resin.

Figure 12:
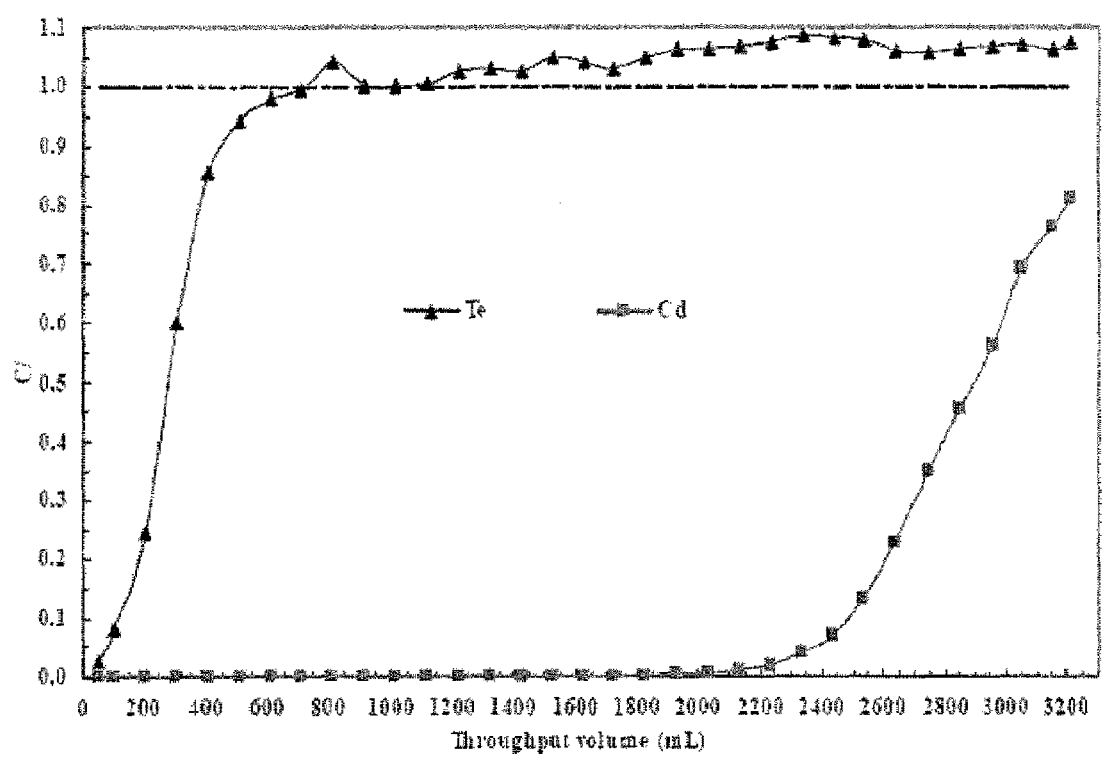
FIG. 12 is a graph depicting the removal of cadmium from cadmium and tellurium-containing solution using AMBERLYST® 15 resin.

The column study results with resin of AMBERLYST® 15 resin are plotted in FIG. 12 (resin volume was 100 mL, influent concentrations were Te-1120 ppm; Cd-942 ppm respectively and the solution flow rate was 300 mL/hour). In this test, the nominal resident time of influent solution in the resin column was 27 minutes.

The same trend is observed except that the breakthrough of cadmium did not occur until 2200 mL of influent was passed though the column. When a total of 3200 mL of influent solution was passed through the resin column, 2.7 grams of cadmium were removed from solution. In the first 1800 mL of collected effluent, the cadmium removal percentage was always 99.9% or better.

Figure 13:
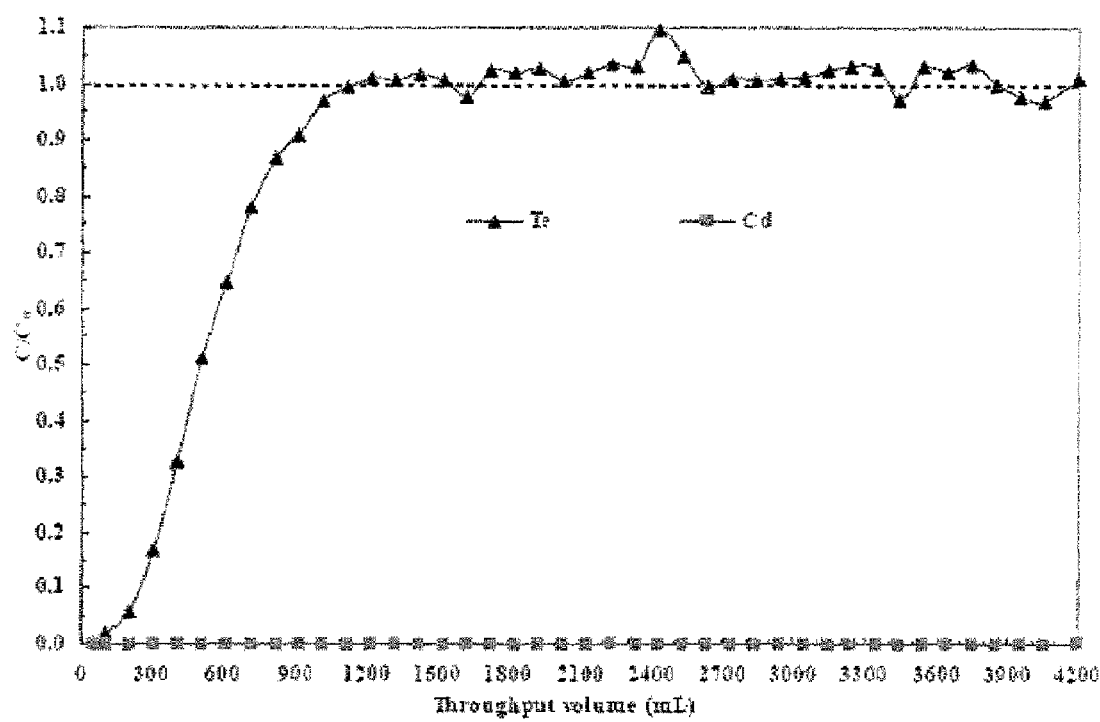
FIG. 13 is a graph depicting the removal of cadmium from cadmium and tellurium-containing solution using AMBERLYST® 15 resin.

When two ion exchange columns were arranged in series, the removal of cadmium increased to 99.99% or better (FIG. 13), although the flow rate was increased and, subsequently, the nominal resident time was decreased to 22 minutes. The flow rate of the influent solution was controlled at 750 mL/hr and a total of 4200 mL of influent solution was passed through the two columns. Influent concentrations were Te-1150 ppm and Cd-989 ppm respectively. The cadmium concentrations in the first 3400 mL of the effluent solution fractions were often below the detection limit of ICP (i.e., <1.5 ppb). In the whole range of 0-3800 mL, the highest measured Cd concentration was 0.5 ppm and the average concentration was 0.04 ppm; in the range 0-3300 mL, the average concentration was 0.02 ppm corresponding to a 99.998% removal of Cd. Overall, the solution fractions collected before breakthrough were basically free of cadmium, and, therefore, high purity tellurium could be recovered subsequent to this separation.

Each and every reference cited herein is hereby incorporated in its entirety for all purposes to the same extent as if each reference were individually incorporated by reference. Furthermore, while the invention has been described in detail with reference to preferred embodiments thereof, it will be apparent to one skilled in the art that various changes can be made, and equivalents employed, without departing from the scope of the invention.

Experiments Involving Separation of Metals

The achievements of the separation of heavy metals, such as copper, from tellurium in liquid phase based on real leaching of retired CdTe PV module fragments or manufacturing wastes are detailed in the following experiments.

In the ion exchange experiments, the cation-exchange resin used was AMBERLYST® 15 resin, although not limited to, manufactured by Rohm and Haas Company. In terms of ion exchange resin column arrangements, three types of exhaustion-regeneration techniques have been devised In the first type column arrangement, two small columns, in series, were used with each column containing 100 mL swollen resin. These two columns are made by graduated PERSPEX® resin of 34 mm inner diameter and 150 mm height. The PERSPEX® resin column was equipped with a bottom filtration device to prevent the escape of fine resin beads during processing. In this arrangement, the influent solution was fed downwards into the first column, then into the second column in the same manner. In the elution cycle, these two small columns were regenerated separately. Two methods have been tried for the regeneration of the small columns. One method was upflow regeneration and the other one was downflow regeneration.

In the second column arrangement, a long, thin single glass column, measuring 700 mm in length and 31 mm in inner diameter, containing a glass frit and a stop-cock at the bottom, loaded with 200 mL swollen resin, was used. In this arrangement, both exhaustion cycle and regeneration cycle used downflow feeding technique, or in another word, co-current.

In the third column arrangement, a long, thin, single glass column, measuring 31 mm in inner diameter, containing a glass frit and one stop-cock at the bottom, another stop-cock at the 200-mL level position from the bottom, and loaded with 400 mL swollen resin, was used. In this arrangement, a counter-current technique was tested. In the exhaustion cycle, influent solution was fed upwards into the column. In the elution cycle, solution was fed downwards into the column.

The ion exchange results corresponding to each column arrangement will be specified in the following sections.

Influent Solutions

In the ion exchange demonstrations, all solutions used were generated from the leaching of the CdTe PV module fragments. Therefore, all results presented in this report were real case studies. Influent solutions were tested from two different sources. In source one, the influent solution (Marked as Influent Solution #3) was provided a manufacturer of the CdTe PV modules. In source two, influent solution was generated (marked as Influent Solution #1 and Influent Solution #2) by leaching the CdTe PV module fragments at Brookhaven National Laboratory (BNL). The metal concentration levels of influent solutions are summarized in Table 4.

TABLE 4

Metal concentrations of influent solutions

| Influent solutions | Elemental concentration, mg/L | | | | pH of influent solutions |
|---|---|---|---|---|---|
| | Al | Te | Cu | Cd | |
| #1 (Influent Solution #1) | 53 | 933 | 302 | 843 | 0.44~0.50 |
| #2 (Influent Solution #2) | 54 | 1029 | 202 | 921 | 0.41~0.42 |
| #3 (Influent Solution #3) | 23 | 392 | 92 | 324 | 0.42 |

Two ion exchange experiments were conducted using Influent Solution (#3) and two ion exchange tests were conducted using Influent Solutions (#1 and #2). In the ion exchange column tests, effluent solutions were collected at different volume fractions and analyzed them by ICP for cadmium, tellurium, copper, and other metals. The results of these four tests are reported in the following.

Experiment A: Two Small Column in Series

In this column test, Influent Solution (#3) was used. The solution contained 329 mg/L of tellurium, 92 mg/L of copper, 23 mg/L of aluminum, and 324 mg/L of cadmium. Two small column in series were used. Each column was loaded with 100-mL of swollen resin. The exhaustion cycle was downward flow feeding. The elution of the resin column was also operated in downward flow manner. The influent feeding rate was controlled at 1200 mL/hr. ICP analysis revealed that the separation of cadmium and copper from tellurium was fairly complete within the first 8 BVs (corresponding to 1600 mL of influent solution) since less than 1 mg/L of cadmium remained in the effluent solution whereas the breakthrough of tellurium occurred almost immediately after feeding of the influent solution. Apparently, the first 8 BVs of effluent solution collected was essentially free of cadmium, which can be directly subjected to tellurium recovery. Beyond the point of 8 BVs, both cadmium and copper started picked up in the effluent solution. The breakthrough point of 10% of the feeding concentration of cadmium occurred at 14 BVs (corresponding to 2800 mL of influent solution). The separation profile of this experiment is shown in FIG. 15.

Figure 15:
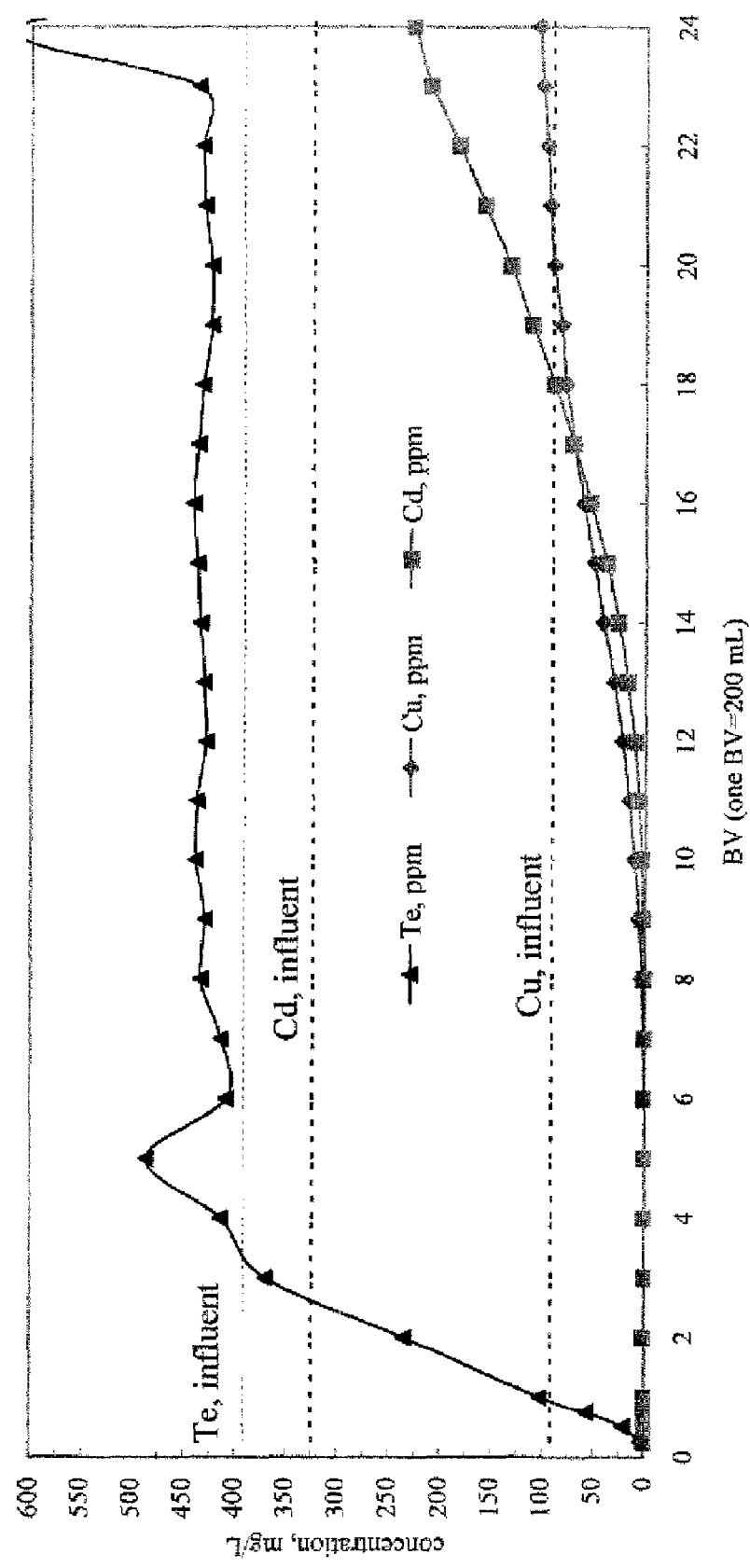
FIG. 15 is a graph depicting separation of cadmium in a two small column series.

FIG. 15 shows separation of cadmium and copper from tellurium by AMBERLYST® 15 WET resin (Influent solution #3 used. Te-329 mg/L, Cd-324 mg/L, Cu-92 mg/L. column arrangement-two small columns in series. Total resin amount-200 mL. Influent solution feeding rate-1200 mL/hr)

Figure 16:
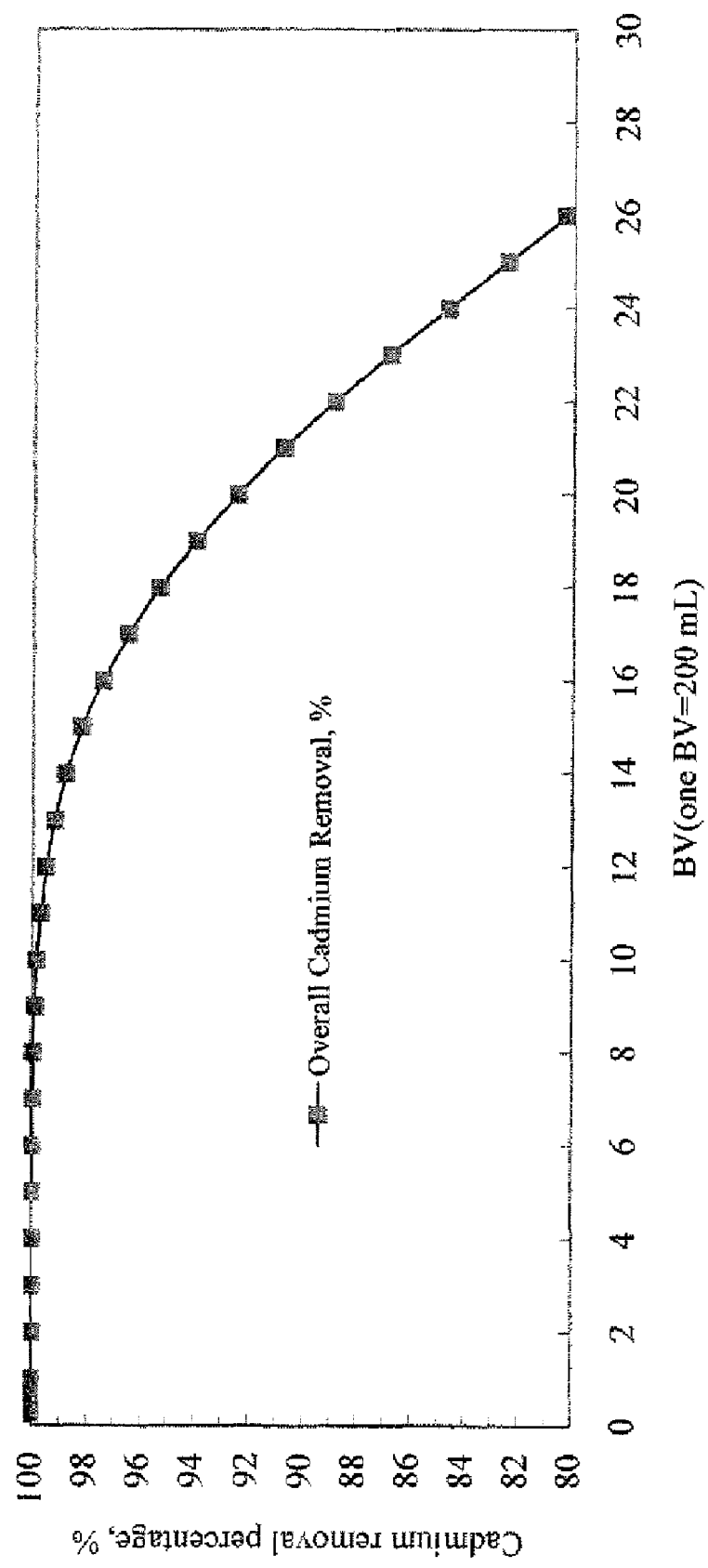
FIG. 16 is a graph depicting overall cadmium removal percentage in a two-column series.

FIG. 16 shows the overall cadmium removal percentage from the influent solution by the ion exchange resin AMBERLYST® 15 wet of the same experiment. As can seen from FIG. 16, within the first 14 BVs (corresponding to 2800 mL) of solution feeding, no less than 99% of cadmium present in the influent was readily removed. Even after a total feeding of 26 BVs (corresponding to 5200 mL) solution, an overall cadmium removal percentage of 80 was still achieved.

FIG. 16 shows overall cadmium removal percentage (Influent solution #3 used, Te-329 mg/L, Cd-324 mg/L, Cu-92 mg/L in a two small column in series. Total resin amount-200 mL. Influent solution feeding rate-1200 mL/hr).

Experiment B: One Single Long Thin Column Test

In this experiment, a glass column, measuring 700 mm in length and 31 mm in inner diameter, was used. The glass column was loaded with 200-mL of swollen resin, AMBERLYST® 15 wet. The exhaustion cycle was downward flow feeding. The elution of the resin column was also operated in downward flow manner. The influent solution flow rate was controlled at 1200 mL/hr. A total of 6279 mL (corresponding to 31.4 BVs) of Influent Solution (#3) was passed downwards through the column.

The elemental analysis using ICP showed that the separation of cadmium and copper from tellurium was fairly complete within the first 7 BVs (corresponding to 1400 mL of influent solution) since less than 1 mg/L of cadmium remained in the effluent solution whereas the breakthrough of tellurium occurred almost immediately after feeding of the influent solution. Obviously, the first 7 BVs of effluent solution collected essentially contained less than 1 mg/L of cadmium, which can be directly subjected to tellurium recovery. Beyond the point of 7 BVs, both cadmium and copper started picked up in the effluent solution. The breakthrough point of 10% of the feeding concentration of cadmium occurred at 13 BVs (corresponding to 2600 mL of influent solution). The separation profile of this experiment is shown in FIG. 17.

Figure 17:
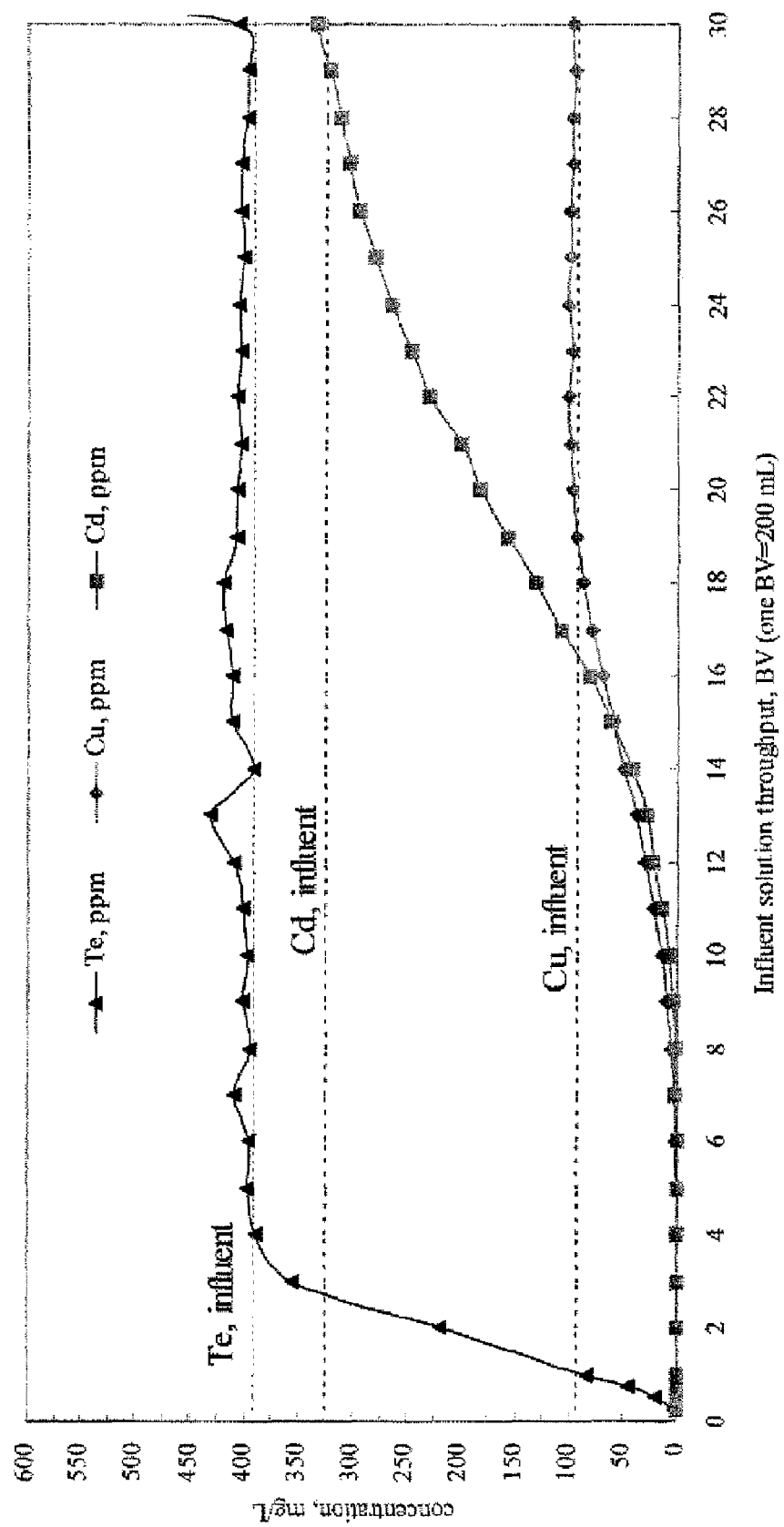
FIG. 17 is a graph depicting separation of cadmium and copper in a single column arrangement.

FIG. 17 shows the separation of cadmium and copper from tellurium by AMBERLYST® 15 WET resin (Influent solution #3 used. Te-329 mg/L, Cd-324 mg/L, Cu-92 mg/L in one single column. Resin amount is 200 mL. Influent solution feeding rate is 1200 mL/hr).

In order to obtain a whole ion exchange separation profile, in this test, the influent solution was fed until the cadmium concentration of effluent solution equaled to that of influent solution, which was observed occurring at 29 BVs (corresponding to 5800 mL of influent solution). At this pointed it was calculated that an overall of 68% of cadmium present in the influent was removed by the resin.

Figure 18:
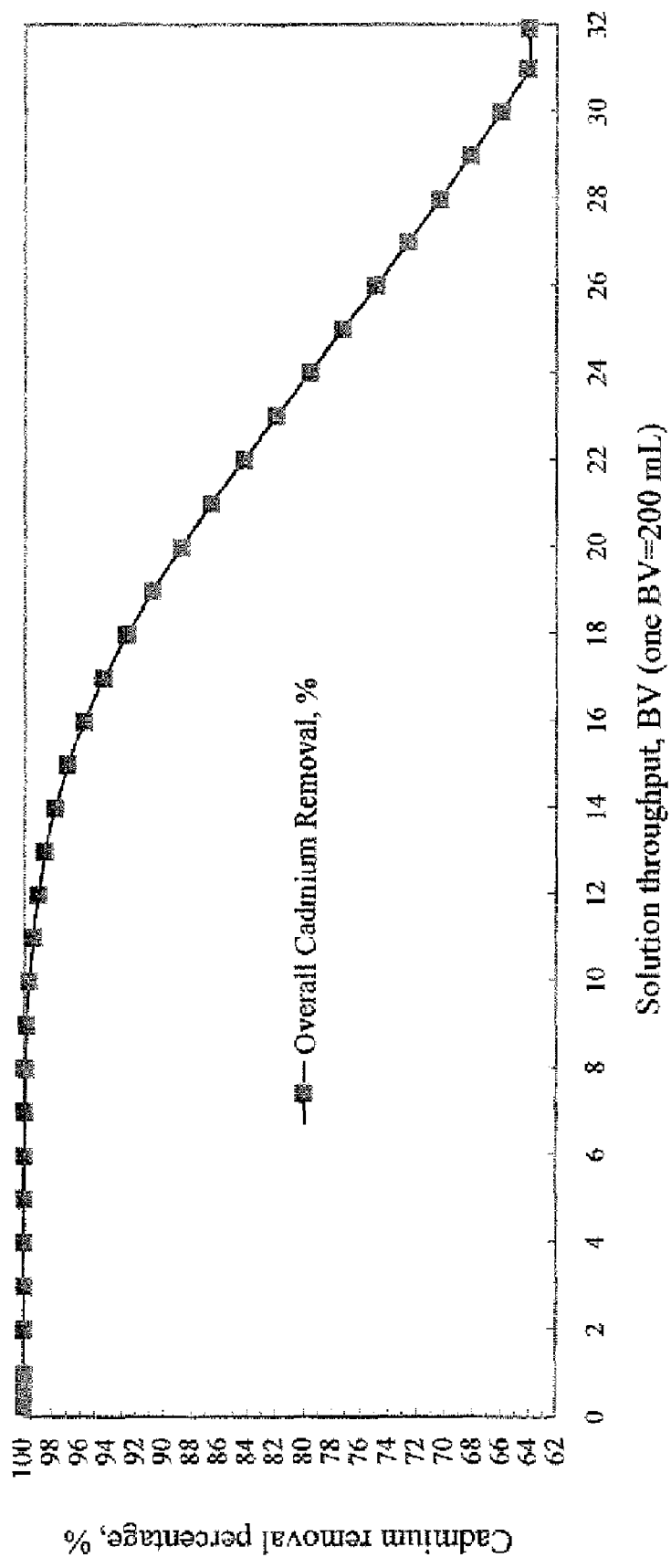
FIG. 18 is a graph depicting overall cadmium removal percentage in a single column arrangement.

Plotted in FIG. 18 is the overall cadmium removal percentage from the influent solution by the ion exchange resin AMBERLYST® 15 wet of the same experiment. As can seen from FIG. 18 within the first 11 BVs (corresponding to 2200 mL) of solution feeding, no less than 99% of cadmium present in the influent was readily removed. Even after a total feeding of 24 BVs (corresponding to 4800 mL) solution, an overall cadmium removal percentage of 80 was still achieved.

The calculation on mass balance of cadmium of ion exchange revealed that, after a total of 6279 mL of solution feeding, 1.223 gram of cadmium was retained on the resin column. This gives an exhaustion loading capacity of 6.115 g-Cd/L-resin. When comparing experiment A with experiment B, results indicated that these two types of column arrangements achieved almost same results although two small columns in series arrangement (A) was slightly better than the long, thin single column arrangement (B) in term of cadmium removal.

Experiment C: Two Small Column in Series

In this column test, the Influent Solution (#1) was used. The solution contained 933 mg/L of tellurium, 302 mg/L of copper, 53 mg/L of aluminum, and 843 mg/L of cadmium. Two small columns in series were used. Each column was loaded with 100-mL of swollen resin. The exhaustion cycle was downward flow feeding. The elution of the resin column was operated in upwards flow manner, e.g., countercurrent. The influent feeding rate was controlled at 1200 mL/hr. A total of 4325 mL (corresponding to 21.6 BVs) of influent solution was passed downwards through the column. ICP analysis revealed that the separation of cadmium and copper from tellurium was better than those of the two previous experiments.

It was found that within the first 10 BVs (bed volumes) (corresponding to 2000 mL of influent solution) less than 1 mg/L of cadmium remained in the effluent solution whereas the breakthrough of tellurium occurred almost immediately after feeding of the influent solution. Apparently, the first 10 BVs of effluent solution collected was essentially free of cadmium, which can be directly subjected to tellurium recovery. Beyond the point of 10 BVs, both cadmium and copper started picked up in the effluent solution. The breakthrough point of 10% of the feeding concentration of cadmium occurred at 15 BVs (corresponding to 3000 mL of influent solution).

Figure 19:
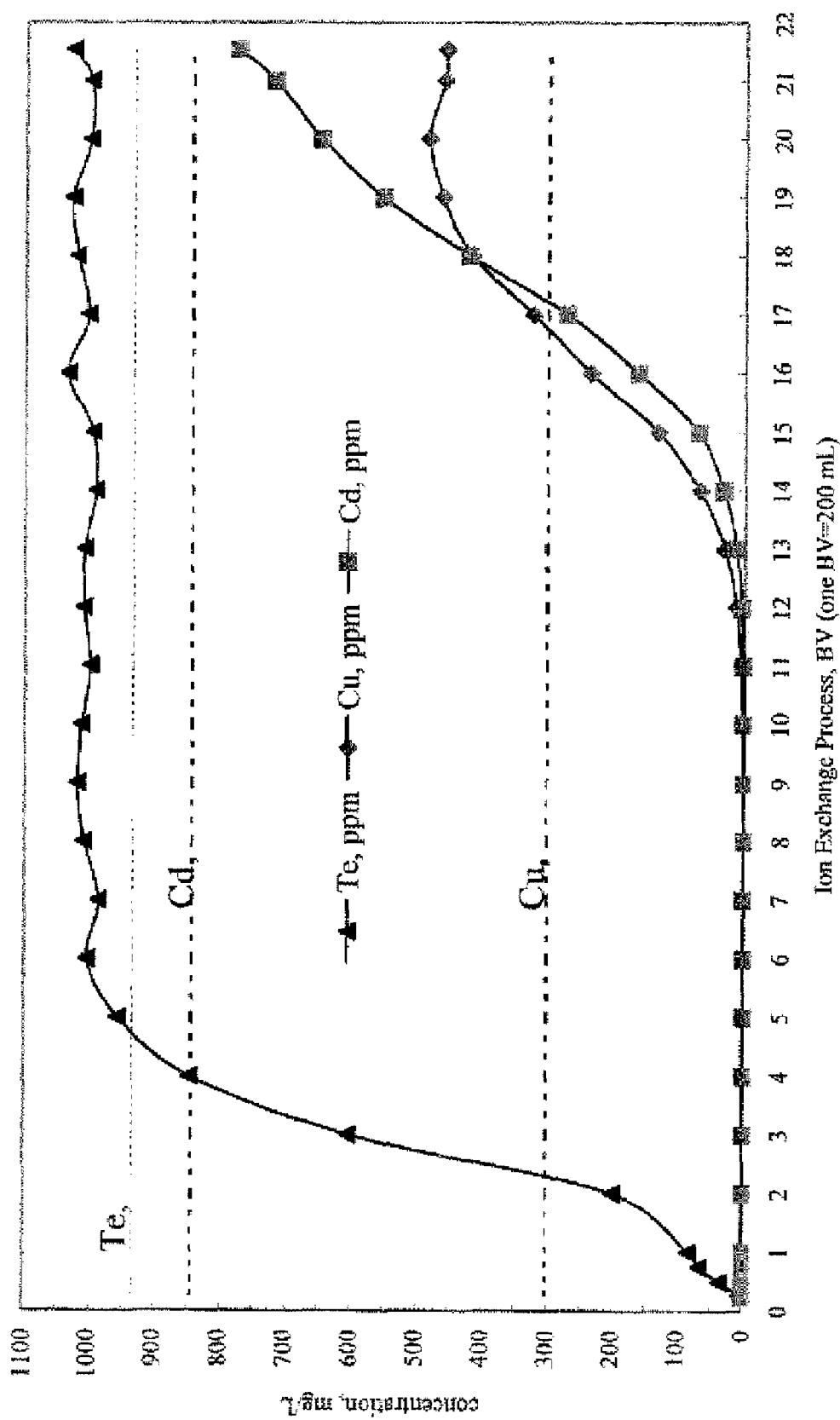
FIG. 19 is a graph depicting separation of cadmium and tellurium in a two-column series.

The separation profile of this experiment is shown in FIG. 19. FIG. 19 shows the separation of cadmium and copper from tellurium by AMBERLYST® 15 WET resin (Influent solution #1 used. Te-933 mg/L, Cd-843 mg/L, Cu-302 mg/L in a two small columns in series. Total resin amount is 200 mL. Influent solution feeding rate-1200 mL/hr).

Due to the limited amount of influent solution was available, the resin column was not completely exhausted after a total feeding of 21.6 BVs of solution. However, the calculation on mass balance of cadmium of ion exchange revealed that, after a total of 21.6 BVs of solution feeding, 2.982 grams of cadmium was retained on the resin column, corresponding to loading of 14.91 g-Cd/L-resin, which was doubled compared with that (6.115 g-Cd/L-resin) of tests on Influent solution #3.

Figure 20:
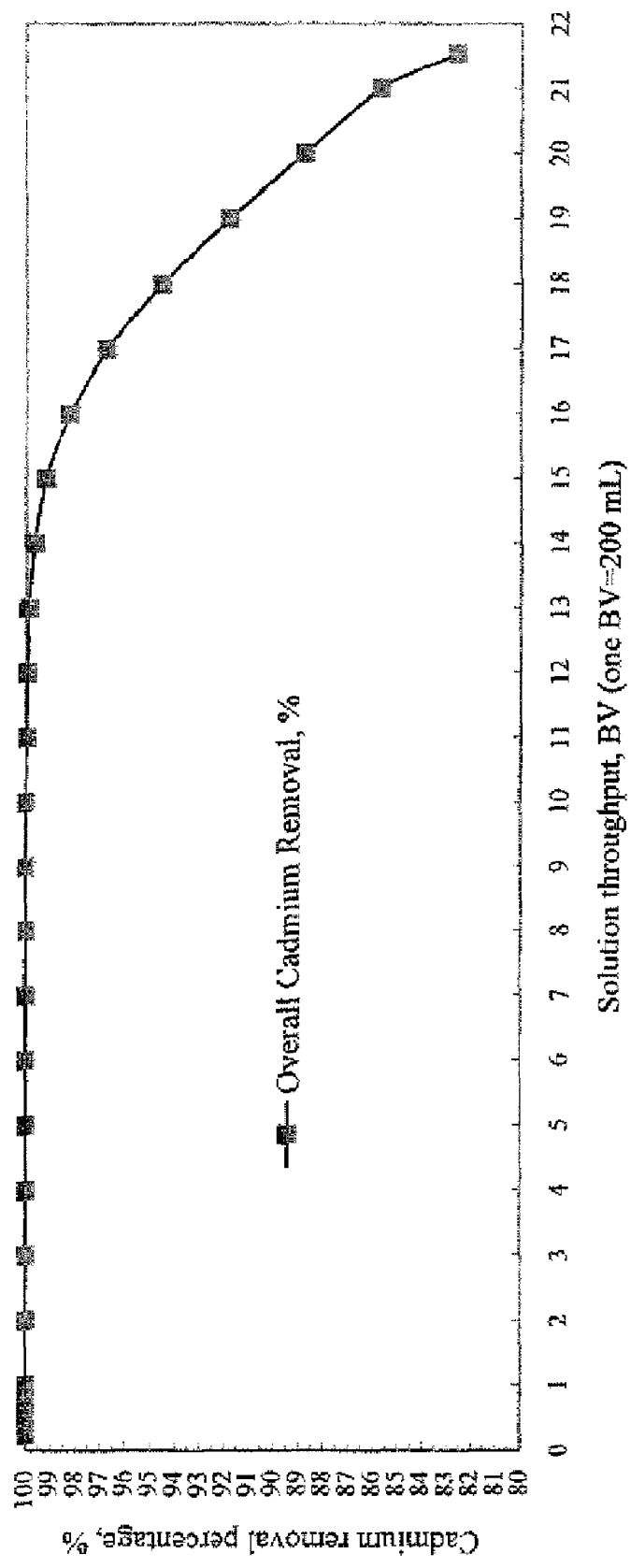
FIG. 20 is a graph depicting overall cadmium removal percentage in a two-column series.

Plotted in FIG. 20 is the overall cadmium removal percentage from the influent solution by the ion exchange resin AMBERLYST® 15 wet of the same experiment. As can seen from FIG. 20, within the first 15 BVs (corresponding to 3000 mL) of solution feeding, no less than 99% of cadmium present in the influent was readily removed. Even after a total feeding of 21.6 BVs (corresponding to 4325 mL) solution, an overall cadmium removal percentage of 82 was still achieved. FIG. 20 shows overall cadmium removal percentage (Influent solution #1 used, Te-933 mg/L, Cd-843 mg/L, Cu-302 mg/L in two small columns in series. Total resin amount is 200 mL. Influent solution feeding rate-1200 mL/hr).

Experiment D: on One Single Long Thin Column Test

In this experiment, a long, thin single glass column, measuring 31 mm in inner diameter, containing a glass frit and one stop-cock at the bottom, another stop-cock at the 200-mL level position from the bottom, and loaded with 400 mL swollen resin, was used. In this arrangement, counter-current technique was tested. In the exhaustion cycle, influent solution was fed upwards into the column. In the elution cycle, solution was fed downwards into the column.

The Influent Solution (#2) contained 1029 mg/L of tellurium, 202 mg/L of copper, 54 mg/L of aluminum, and 921 mg/L of cadmium. A total of 400 mL swollen resin was used in this experiment. The influent feeding rate was controlled at 1200 mL/hr. A total of 10413 mL (corresponding to 26 BVs) of Influent Solution (#2) was passed upwards through the column. ICP analysis revealed that the overall separation of cadmium and copper from tellurium was fairly complete although leakage of cadmium took place earlier than those of previous experiments.

It was found that within the first 3 BVs (corresponding to 1200 mL of influent solution) less than 1 mg/L of cadmium remained in the effluent solution whereas the breakthrough of tellurium occurred almost immediately after feeding of the influent solution. Apparently, the first 3 BVs of effluent solution collected was essentially free of cadmium, which can be directly subjected to tellurium recovery. Beyond the point of 3 BVs, both cadmium and copper started picked up in the effluent solution. The breakthrough point of 10% of the feeding concentration of cadmium occurred at 17 BVs (corresponding to 6800 mL of influent solution).

Figure 21:
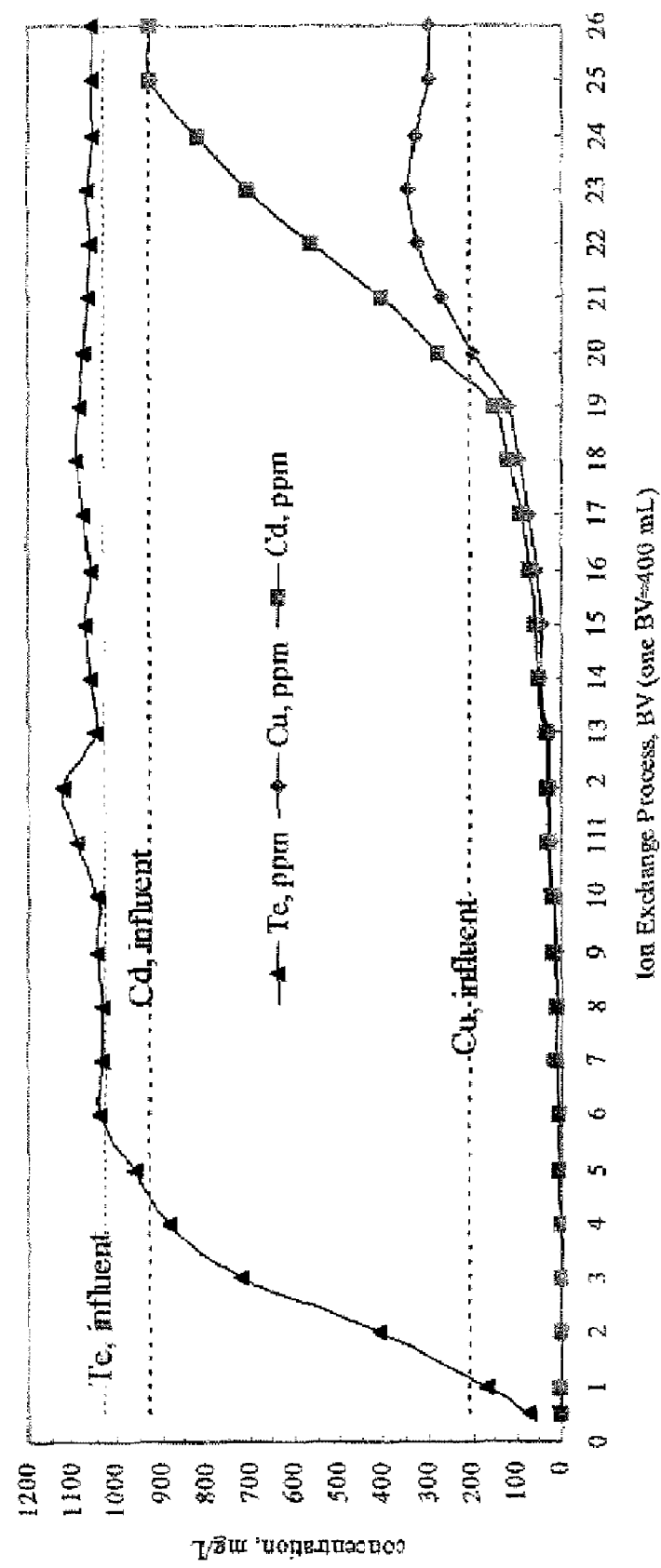
FIG. 21 is a graph depicting separation of cadmium and copper from tellurium.

The separation profile of this experiment is shown in FIG. 21. With sufficient amount of influent available, one can determine the exhaustion point for cadmium, which was found occurred at 25 BVs (corresponding to 10,000 mL of influent solution). The calculation on mass balance of cadmium of ion exchange revealed that, after a total of 26 BVs of solution feeding, 7.46 grams of cadmium was retained on the resin column, corresponding to exhaustion loading capacity of 18.65 g-Cd/L-resin, which was tripled compared with that (6.115 g-Cd/L-resin) of tests on Influent Solution #3.

FIG. 21 shows separation of cadmium and copper from tellurium by AMBERLYST® 15 WET (Influent solution #2 was used. Te-1029 mg/L, Cd-921 mg/L, Cu-202 mg/L, column arrangement is one single column. Total resin amount is 400 mL. Influent solution feeding rate-1200 mL/hr, upwards feeding).

Figure 22:
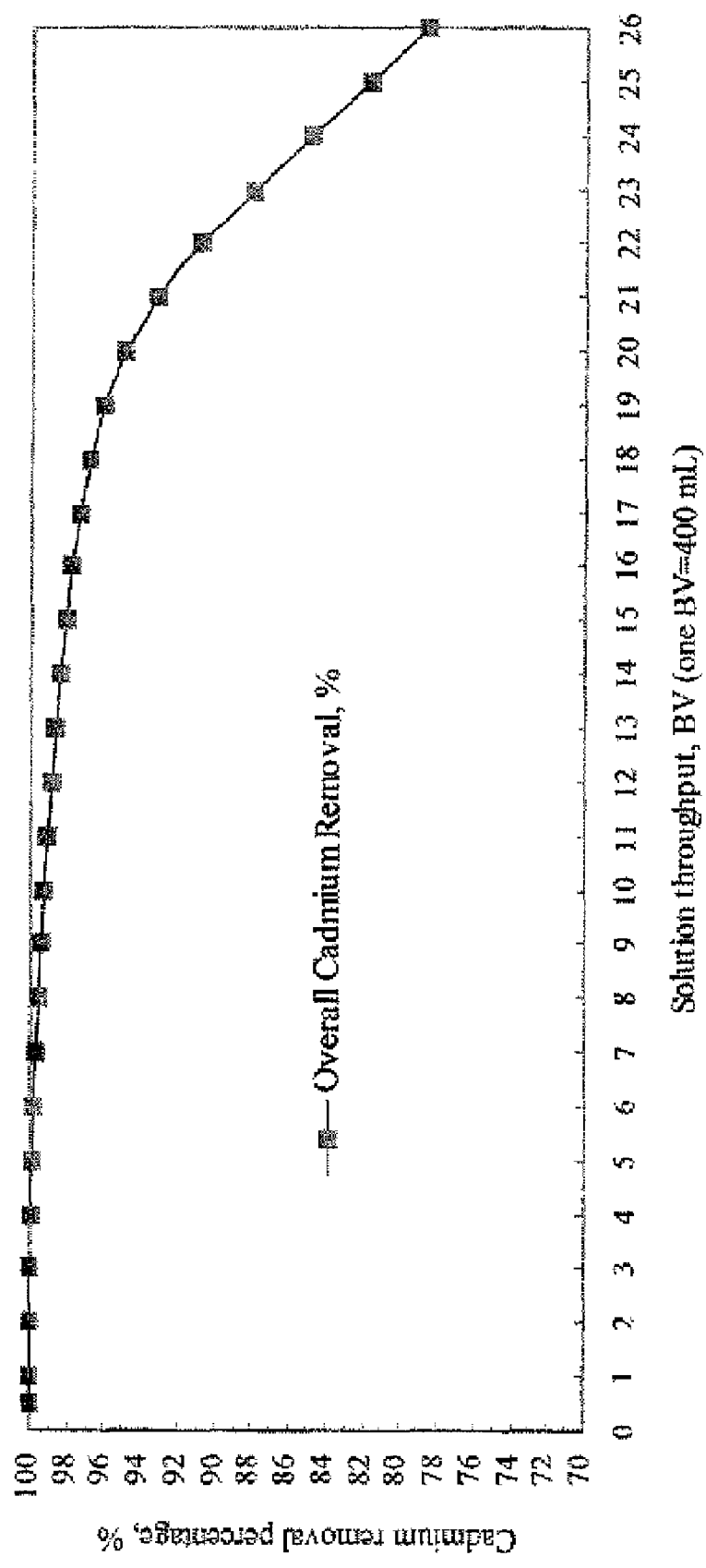
FIG. 22 is a graph depicting overall cadmium removal percentage in a single column arrangement.

Plotted in FIG. 22 is the overall cadmium removal percentage from the influent solution by the ion exchange resin AMBERLYST® 15 wet of the same experiment. As can seen from FIG. 22, within the first 11 BVs (corresponding to 4400 mL) of solution feeding, no less than 99% of cadmium present in the influent was readily removed. Even after a total feeding of 22 BVs (corresponding to 8800 mL) solution, an overall cadmium removal percentage of 90 was still achieved. FIG. 22 shows overall cadmium removal percentage (Influent solution #2 was used. Te-1029 mg/L, Cd-921 mg/L, Cu-202 mg/L, column arrangement is one single column. Total resin amount is 400 mL. Influent solution feeding rate-1200 mL/hr, upwards feeding).

In this upwards flow ion exchange experiment, an interesting phenomenon became apparent in the results: the concentration of cadmium was all the way higher than that of copper in the effluent solution as seen from FIG. 21. As for any other previous ion exchange experiments, without exception, the concentration of copper was basically higher than that of cadmium in the effluent solution prior to the exhaustion point for copper, which was consistent with the theory that the selectivity to cadmium is higher than to copper for cation exchange resin. One explanation for the present finding is that influent solution flow direction may also play an important role to the ion exchange mechanism.

Separation of Metals Using Two Types of Resins

An advanced system is devised that can be used to completely separate cadmium, tellurium, and other metals, such as copper, present in the leaching solution, thus making it possible for the recovery of high purity tellurium and copper. The two resins used were chelating resin, DOWEX™ M4195 by Dow Chemical Company and cation exchange resin, AMBERLYST® 15, although resins are not limited to such two types. DOWEX™ M4195 resin was chosen for its selectivity for copper, along with its high removal efficiency (effluent streams have extremely low concentrations of copper, even at very low pH. The chemistry of DOWEX™ M4195 resin is based upon a special chelating amine ligand which can be partially quaternized by sulfuric acid as received. When in this conjugate sulfuric acid salt form, the resin is fully swollen and hydrated, and ready for scavenging metals from acidic media.

The influent solution used in this demonstration was also from the leaching of the real CdTe PV module fragments. The influent solution contained 980 mg/L of tellurium, 237 mg/L of copper, 177 mg/L of iron, and 908 mg/L of cadmium. Two columns in series were used. The first column was loaded with 200-mL of swollen chelating resin, M4195, specifically used for copper removal only. The second column was loaded with 200-mL of swollen cation exchange resin, AMBERLYST® 15 for the removal of cadmium, iron, and other heavy metals.

Figure 23:
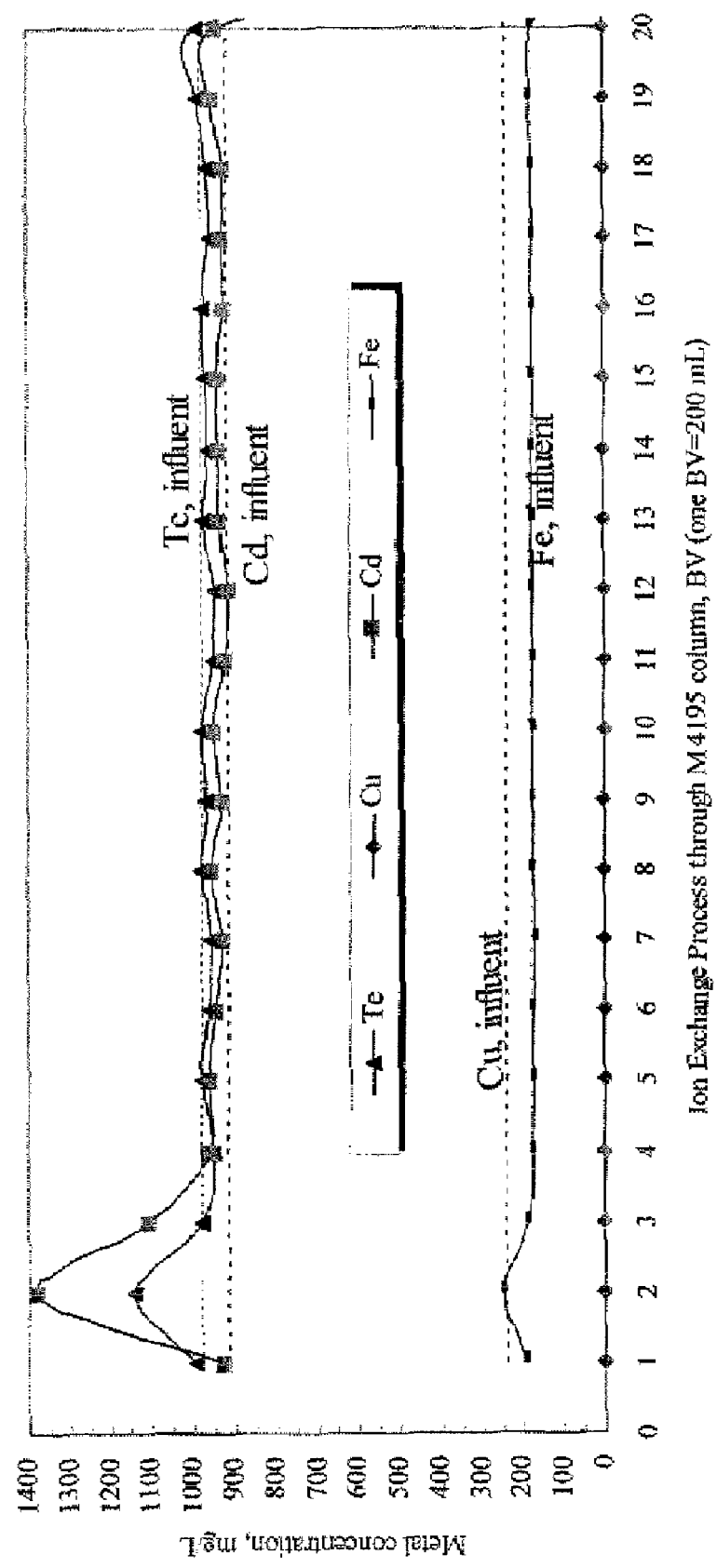
FIG. 23 is a graph depicting copper removal by chelating resin.

The influent solution was first fed into the first column, e.g. resin M4195, downwards, then passed through the second column, e.g., resin AMBERLYST® 15. It was found that only the copper was removed when the influent solution was passed through the first column. It was also confirmed that both the cadmium and iron were removed by the second column when the solution from first column was passed through the second column, thus leaving the tellurium retained in the solution. Through such treatment, three metals, cadmium, tellurium, and copper were separated completely. The results are plotted in the following figures. As seen in FIG. 23, only the copper was removed from the leaching solution by the resin M4195. FIG. 23 shows copper removal by the resin M4195, (Te-980 mg/L, Cd-908 mg/L, Cu-237 mg/L, Fe-177 mg/L. The resin amount is 200 mL. Influent solution feeding rate-600 mL/hr, downwards feeding)

Figure 24:
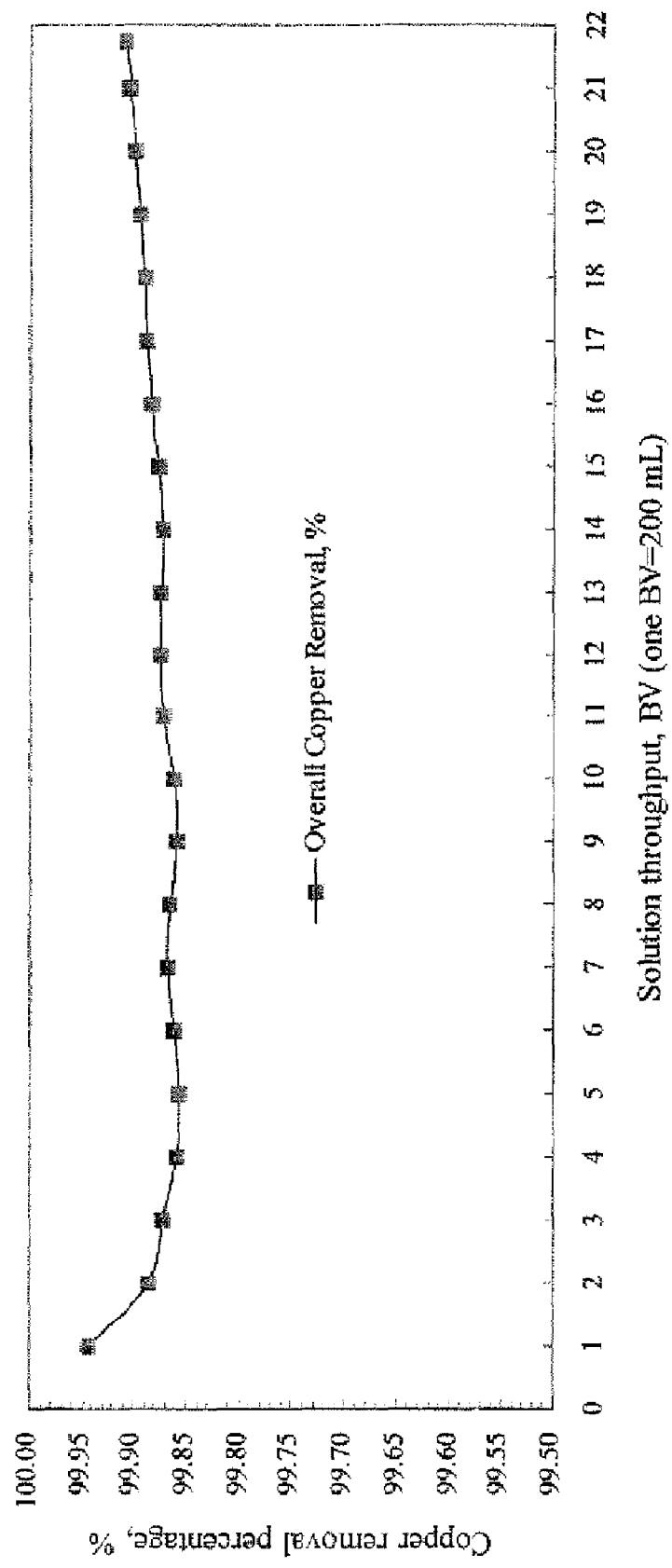
FIG. 24 is a graph depicting overall copper removal percentage by chelating resin.

The overall copper removal percentage was more than 99.0% as shown in FIG. 24. FIG. 24 shows overall copper removal percentage by the resin M4195, (Influent solution #2, Te-980 mg/L, Cd-908 mg/L, Cu-237 mg/L, Fe-177 mg/L. The resin amount is 200 mL. Influent solution feeding rate-600 mL/hr, downwards feeding).

Figure 25:
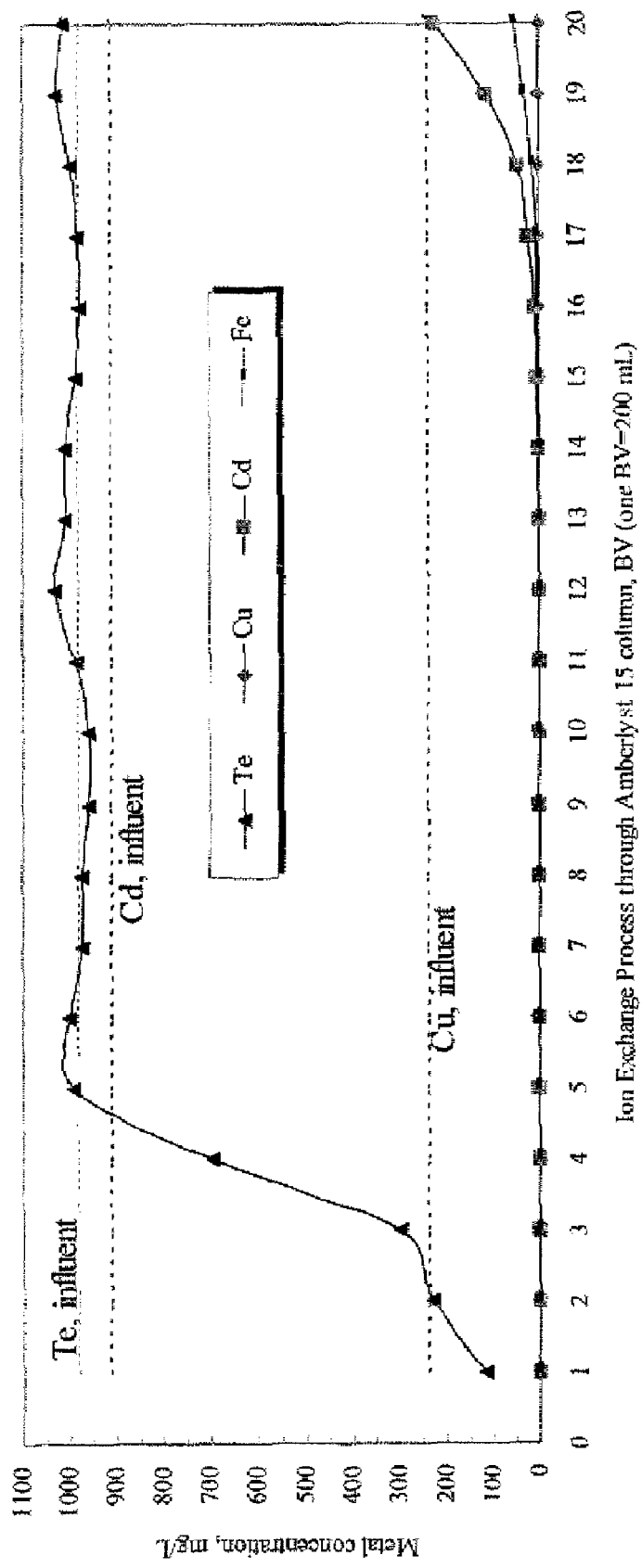
FIG. 25 is a graph depicting cadmium and iron removal.
Figure 26:
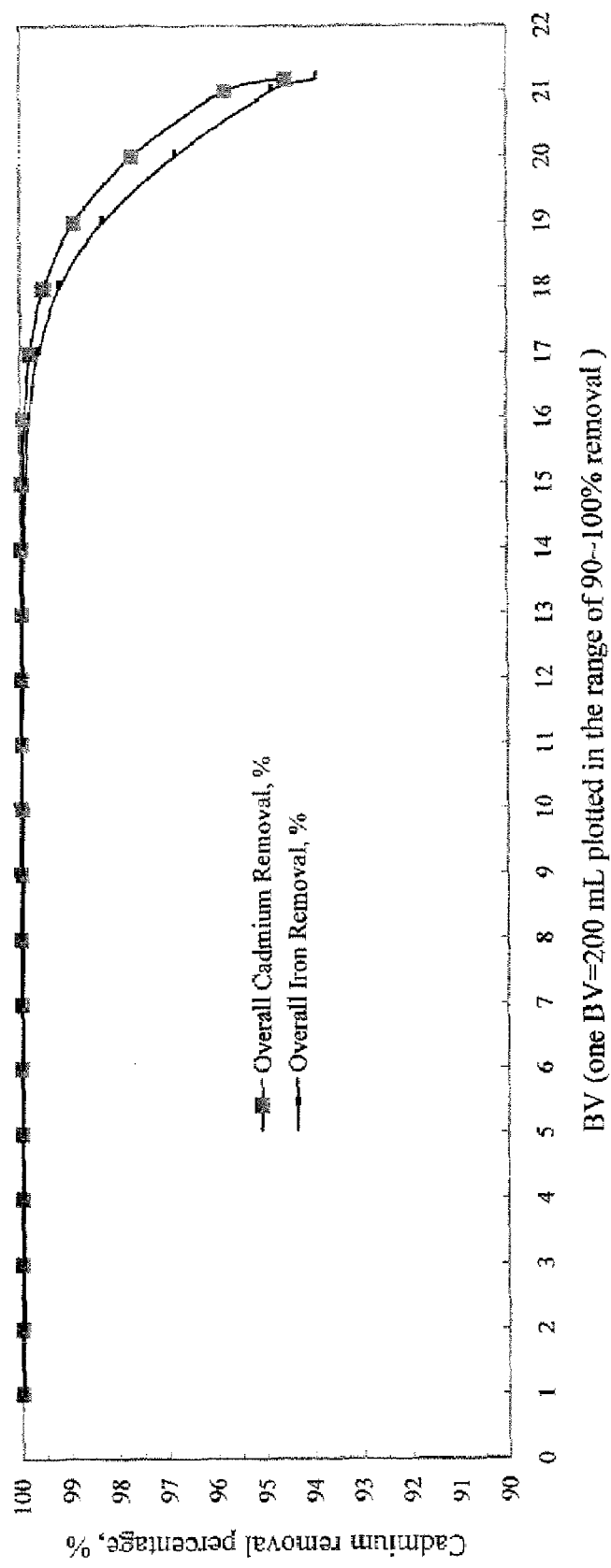
FIG. 26 is a graph depicting overall cadmium and iron removal.

As seen in FIGS. 25 and 26, when the solution from the first resin column passed through the second column, only the cadmium and iron were removed from the solution by the resin AMBERLYST® 15, leaving tellurium in the solution phase. The overall cadmium and iron removal percentage was more than 99.0% for the first 15 BVs (corresponding to 3000 mL of solution) of liquid. FIG. 25 shows cadmium and iron removal by the resin AMBERLYST® 15 (Te-980 mg/L, Cd-908 mg/L, Cu-237 mg/L, Fe-177 mg/L. The resin amount is 200 mL. Influent solution feeding rate-600 mL/hr, upwards feeding). FIG. 26 shows overall cadmium and iron removal percentage the resin AMBERLYST® 15 (Influent solution #2, Te-980 mg/L, Cd-908 mg/L, Cu-237 mg/L, Fe-177 mg/L. The resin amount is 200 mL. Influent solution feeding rate-600 mL/hr, upwards feeding).

Other embodiments are within the scope of the following claims.

What is claimed is:

1. A method for recycling a photovoltaic device comprising:
    fragmenting a photovoltaic device;
    exposing at least a portion of a photovoltaic device with a leaching agent to form a liquid phase, including tellurium and cadmium extracted from the photovoltaic device, and a solid phase;
    separating the liquid phase from the solid phase;
    contacting the liquid phase with a cation exchange resin;
    collecting from the resin a tellurium containing solution comprising substantially all of the extracted tellurium; and
    removing cadmium from the resin.

2. The method of claim 1, wherein the fragments comprise cadmium, tellurium and glass.

3. The method of claim 1, wherein the cadmium and the tellurium is extracted from the fragments at ambient temperature.

4. The method of claim 1, wherein the leaching agent has a pH of less than 6.

5. The method of claim 1, wherein the leaching agent includes sulfuric acid.

6. The method of claim 5, wherein the sulfuric acid has a concentration of at least 0.5 M.

7. The method of claim 6, wherein a ratio of hydrogen peroxide to glass is less than 5.0.

8. The method of claim 1, wherein the leaching agent includes hydrogen peroxide.

9. The method of claim 1, wherein the leaching agent has a liquid to solid ratio that is less than 480 mL/kg.

10. The method of claim 1, wherein the liquid phase has a pH range of 0.0 to 1.0.

11. The method of claim 1, wherein the cadmium is removed from the resin at room temperature.

12. The method of claim 1, wherein the cadmium is removed from the resin with an acid that has a pH of less than 6.

13. The method of claim 12, wherein cadmium is removed from the resin with an acid that has a pH of less than 4.

14. The method of claim 1, wherein cadmium is removed from the resin with an acid that has a pH of less than 2.

15. The method of claim 1, wherein the cadmium is removed from the resin with sulfuric acid.

16. The method of claim 1, wherein the cation exchange resin is an iminodiacetic acid chelating resin.

17. The method of claim 1, wherein the cation exchange resin is an acid cation resin containing at least 8% divinylbenzene.

18. The method of claim 1, wherein the cation exchange resin is first swelled with water.

19. The method of claim 1, further comprising removing at least one additional metal from the resin.

20. The method of claim 19, wherein the additional metal includes copper.

21. A method for separating cadmium and tellurium comprising:
    contacting a tellurium-containing solution with a cation exchange resin;
    collecting from the resin a solution comprising substantially all of the tellurium of the tellurium-containing solution; and
    removing cadmium from the cation exchange resin.

22. The method of claim 21, further comprising removing at least one additional metal from the resin.

23. The method of claim 22, wherein the additional metal includes copper.

* * * * *